United States Patent
Havlark et al.

(10) Patent No.: US 9,599,717 B2
(45) Date of Patent: Mar. 21, 2017

(54) WIRELESS TELECOMMUNICATIONS LOCATION BASED SERVICES SCHEME SELECTION

(71) Applicant: TeleCommunication Systems, Inc., Annapolis, MD (US)

(72) Inventors: Arlene Havlark, Seattle, WA (US); Victor Burton, Bellevue, WA (US); John Ahrens, Maple Valley, WA (US)

(73) Assignee: Telecommunication Systems, Inc., Annapolis, MD (US)

( * ) Notice: Subject to any disclaimer, the term of this patent is extended or adjusted under 35 U.S.C. 154(b) by 0 days.

(21) Appl. No.: 14/448,581

(22) Filed: Jul. 31, 2014

(65) Prior Publication Data

US 2014/0349678 A1    Nov. 27, 2014

Related U.S. Application Data

(63) Continuation of application No. 11/730,085, filed on Mar. 29, 2007, now Pat. No. 8,918,073, which is a
(Continued)

(51) Int. Cl.
*H04W 4/02* (2009.01)
*G01S 19/05* (2010.01)
(Continued)

(52) U.S. Cl.
CPC ............ *G01S 19/05* (2013.01); *G01S 5/0054* (2013.01); *G01S 5/0236* (2013.01); *G01S 5/0252* (2013.01); *H04W 4/02* (2013.01)

(58) Field of Classification Search
CPC ............ H04W 4/02; H04Q 7/20; G06F 15/16
See application file for complete search history.

(56) References Cited

U.S. PATENT DOCUMENTS

| 1,103,073 A | 7/1914 | O'Connell |
| 4,445,118 A | 4/1984 | Taylor et al. |

(Continued)

FOREIGN PATENT DOCUMENTS

| SE | WO99/21380 | 4/1999 |
| WO | WO01/45342 | 6/2001 |

(Continued)

OTHER PUBLICATIONS

Le-Pond Chin, Jyh-Hong Wen, Ting-Way Liu, The Study of the Interconnection of GSM Mobile Communications Systems Over IP Based Network, May 6, 2001, IEEE, Vehicular Technology Conference, vol. 3, pp. 2219-2223.
(Continued)

*Primary Examiner* — Myron K Wyche
(74) *Attorney, Agent, or Firm* — Tarolli, Sundheim, Covell & Tummino LLP

(57) ABSTRACT

An intelligent system for choosing selection schemes to be tried in a predetermined order for determining the location of a wireless mobile client, including retrieving a last known position record from a cache, checking serving network capability, choosing an initial selection scheme according to parameters including at least the required response time and the requested location method, including a method employing navigational satellites, attempting to retrieve a current position record, trying successive untried selection schemes in turn according to a predetermined algorithm if no current position record has been retrieved, and returning the current position record and updating the last known position record, or returning an error if no current position record has been retrieved, and returning the last known position record if an error has been returned, the last known position record exists in the cache and the last known position record has not expired.

7 Claims, 32 Drawing Sheets

Related U.S. Application Data continuation of application No. 10/379,940, filed on Mar. 6, 2003, now Pat. No. 7,200,380, which is a continuation of application No. 10/339,403, filed on Jan. 10, 2003, now abandoned.

(60) Provisional application No. 60/367,707, filed on Mar. 28, 2002.

(51) Int. Cl.
*G01S 5/00* (2006.01)
*G01S 5/02* (2010.01)

(56) References Cited

U.S. PATENT DOCUMENTS

| | | |
|---|---|---|
| 4,494,119 A | 1/1985 | Wimbush |
| 4,651,156 A | 3/1987 | Martinez |
| 4,706,275 A | 11/1987 | Kamil |
| 4,737,916 A | 4/1988 | Ogawa |
| 4,891,638 A | 1/1990 | Davis |
| 4,891,650 A | 1/1990 | Scheffer |
| 4,939,662 A | 7/1990 | Numura |
| 4,952,928 A | 8/1990 | Carroll |
| 4,972,484 A | 11/1990 | Theile |
| 5,014,206 A | 5/1991 | Scribner |
| 5,043,736 A | 8/1991 | Darnell |
| 5,055,851 A | 10/1991 | Scheffer |
| 5,068,656 A | 11/1991 | Sutherland |
| 5,068,891 A | 11/1991 | Marshall |
| 5,070,329 A | 12/1991 | Jasimaki |
| 5,081,667 A | 1/1992 | Drori |
| 5,119,104 A | 6/1992 | Heller |
| 5,126,722 A | 6/1992 | Kamis |
| 5,144,283 A | 9/1992 | Arens |
| 5,161,180 A | 11/1992 | Chavous |
| 5,166,972 A | 11/1992 | Smith |
| 5,177,478 A | 1/1993 | Wagai |
| 5,193,215 A | 3/1993 | Olmer |
| 5,208,756 A | 5/1993 | Song |
| 5,214,789 A | 5/1993 | George |
| 5,218,367 A | 6/1993 | Scheffer |
| 5,223,844 A | 6/1993 | Mansell |
| 5,239,570 A | 8/1993 | Koster |
| 5,265,630 A | 11/1993 | Hartmann |
| 5,266,944 A | 11/1993 | Caroll |
| 5,283,570 A | 2/1994 | DeLuca |
| 5,289,527 A | 2/1994 | Tiedemann |
| 5,293,642 A | 3/1994 | Lo |
| 5,299,132 A | 3/1994 | Wortham |
| 5,301,354 A | 4/1994 | Schwendeman |
| 5,311,516 A | 5/1994 | Kuznicke |
| 5,325,302 A | 6/1994 | Izidon |
| 5,327,529 A | 7/1994 | Fults |
| 5,334,974 A | 8/1994 | Simms |
| 5,335,246 A | 8/1994 | Yokev |
| 5,343,493 A | 8/1994 | Karimulah |
| 5,347,568 A | 9/1994 | Moody |
| 5,351,235 A | 9/1994 | Lahtinen |
| 5,361,212 A | 11/1994 | Class |
| 5,363,425 A | 11/1994 | Mufti |
| 5,365,451 A | 11/1994 | Wang |
| 5,374,936 A | 12/1994 | Feng |
| 5,379,451 A | 1/1995 | Nakagoshi |
| 5,381,338 A | 1/1995 | Wysocki |
| 5,387,993 A | 2/1995 | Heller |
| 5,388,147 A | 2/1995 | Grimes |
| 5,389,934 A | 2/1995 | Kass |
| 5,390,339 A | 2/1995 | Bruckery |
| 5,394,158 A | 2/1995 | Chia |
| 5,396,227 A | 3/1995 | Carroll |
| 5,398,190 A | 3/1995 | Wortham |
| 5,406,614 A | 4/1995 | Hara |
| 5,418,537 A | 5/1995 | Bird |
| 5,422,813 A | 6/1995 | Schuchman |
| 5,423,076 A | 6/1995 | Westergren |
| 5,434,789 A | 7/1995 | Fraker |
| 5,454,024 A | 9/1995 | Lebowitz |
| 5,461,390 A | 10/1995 | Hosher |
| 5,470,233 A | 11/1995 | Fruchterman |
| 5,479,408 A | 12/1995 | Will |
| 5,479,482 A | 12/1995 | Grimes |
| 5,485,161 A | 1/1996 | Vaugh |
| 5,485,163 A | 1/1996 | Singer |
| 5,488,563 A | 1/1996 | Chazelle |
| 5,494,091 A | 2/1996 | Freeman |
| 5,497,149 A | 3/1996 | Fast |
| 5,504,491 A | 4/1996 | Chapman |
| 5,506,886 A | 4/1996 | Maine |
| 5,508,931 A | 4/1996 | Snider |
| 5,513,243 A | 4/1996 | Kage |
| 5,515,287 A | 5/1996 | Hakoyama |
| 5,517,199 A | 5/1996 | DiMattei |
| 5,519,403 A | 5/1996 | Bickley |
| 5,530,655 A | 6/1996 | Lokhoff |
| 5,530,914 A | 6/1996 | Dennison |
| 5,532,690 A | 7/1996 | Hertel |
| 5,535,434 A | 7/1996 | Siddoway |
| 5,539,395 A | 7/1996 | Buss |
| 5,539,398 A | 7/1996 | Hall |
| 5,539,829 A | 7/1996 | Lokhoff |
| 5,543,776 A | 8/1996 | L'Esperance |
| 5,546,445 A | 8/1996 | Dennison |
| 5,552,772 A | 9/1996 | Janky |
| 5,555,286 A | 9/1996 | Tendler |
| 5,557,254 A | 9/1996 | Johnson |
| 5,568,119 A | 10/1996 | Schipper |
| 5,568,153 A | 10/1996 | Beliveau |
| 5,574,648 A | 11/1996 | Pilley |
| 5,579,372 A | 11/1996 | Angstrom |
| 5,588,009 A | 12/1996 | Will |
| 5,592,535 A | 1/1997 | Klotz |
| 5,594,780 A | 1/1997 | Wiedeman |
| 5,604,486 A | 2/1997 | Lauro |
| 5,606,313 A | 2/1997 | Allen |
| 5,606,618 A | 2/1997 | Lokhoff |
| 5,606,850 A | 3/1997 | Nakamura |
| 5,610,815 A | 3/1997 | Gudat |
| 5,614,890 A | 3/1997 | Fox |
| 5,615,116 A | 3/1997 | Gudat |
| 5,621,793 A | 4/1997 | Bednarek |
| 5,628,051 A | 5/1997 | Salin |
| 5,629,693 A | 5/1997 | Janky |
| 5,633,912 A | 5/1997 | Tsoi |
| 5,636,122 A | 6/1997 | Shah |
| 5,636,276 A | 6/1997 | Brugger |
| 5,661,652 A | 8/1997 | Sprague |
| 5,661,755 A | 8/1997 | Van de Kerkhof |
| 5,682,600 A | 10/1997 | Salin |
| 5,684,951 A | 11/1997 | Goldman |
| 5,689,245 A | 11/1997 | Noreen |
| 5,689,269 A | 11/1997 | Norris |
| 5,689,809 A | 11/1997 | Grube |
| 5,699,053 A | 12/1997 | Jonsson |
| 5,727,057 A | 3/1998 | Emery |
| 5,731,785 A | 3/1998 | Lemelson |
| 5,740,534 A | 4/1998 | Ayerst |
| 5,761,618 A | 6/1998 | Lynch |
| 5,765,152 A | 6/1998 | Erickson |
| 5,767,795 A | 6/1998 | Schaphorst |
| 5,768,509 A | 6/1998 | Gunluk |
| 5,771,353 A | 6/1998 | Eggleston |
| 5,774,533 A | 6/1998 | Patel |
| 5,774,670 A | 6/1998 | Montulli |
| 5,774,824 A | 6/1998 | Streit |
| 5,787,357 A | 7/1998 | Salin |
| 5,794,142 A | 8/1998 | Vanttila |
| 5,797,094 A | 8/1998 | Houde |
| 5,797,096 A | 8/1998 | Lupien |
| 5,801,700 A | 9/1998 | Ferguson |
| 5,802,492 A | 9/1998 | DeLorme |
| 5,806,000 A | 9/1998 | Vo |
| 5,809,415 A | 9/1998 | Rossman |
| 5,812,086 A | 9/1998 | Bertiger |

(56) References Cited

U.S. PATENT DOCUMENTS

| | | |
|---|---|---|
| 5,812,087 A | 9/1998 | Krasner |
| 5,822,700 A | 10/1998 | Hult |
| 5,828,740 A | 10/1998 | Khue |
| 5,841,396 A | 11/1998 | Krasner |
| 5,857,201 A | 1/1999 | Wright, Jr. |
| 5,864,667 A | 1/1999 | Barkam |
| 5,874,914 A | 2/1999 | Krasner |
| 5,896,369 A | 4/1999 | Warsta |
| 5,920,821 A | 7/1999 | Seaholtz |
| 5,922,074 A | 7/1999 | Richard |
| 5,926,118 A | 7/1999 | Hayashida |
| 5,930,250 A | 7/1999 | Klok |
| 5,944,768 A | 8/1999 | Ito |
| 5,953,398 A | 9/1999 | Hill |
| 5,960,362 A | 9/1999 | Grob |
| 5,974,054 A | 10/1999 | Couts |
| 5,978,685 A | 11/1999 | Laiho |
| 5,982,301 A | 11/1999 | Ohta |
| 5,983,099 A | 11/1999 | Yao |
| 5,983,109 A | 11/1999 | Montoya |
| 5,987,323 A | 11/1999 | Huotari |
| 5,998,111 A | 12/1999 | Abe |
| 5,999,124 A | 12/1999 | Sheynblat |
| 6,002,936 A | 12/1999 | Roel-Ng |
| 6,014,602 A | 1/2000 | Kithol |
| 6,032,051 A | 2/2000 | Hall |
| 6,035,025 A | 3/2000 | Hanson |
| 6,035,253 A | 3/2000 | Hayashi |
| 6,049,710 A | 4/2000 | Nilsson |
| 6,052,081 A | 4/2000 | Krasner |
| 6,058,300 A | 5/2000 | Hanson |
| 6,058,338 A | 5/2000 | Agashe et al. |
| 6,061,018 A | 5/2000 | Sheynblat |
| 6,061,346 A | 5/2000 | Nordman |
| 6,064,336 A | 5/2000 | Krasner |
| 6,064,875 A | 5/2000 | Morgan |
| 6,067,045 A | 5/2000 | Castelloe |
| 6,070,067 A | 5/2000 | Nguyen |
| 6,075,982 A | 6/2000 | Donovan |
| 6,081,229 A | 6/2000 | Soliman |
| 6,081,508 A | 6/2000 | West |
| 6,085,320 A | 7/2000 | Kaliski, Jr. |
| 6,091,957 A | 7/2000 | Larkins |
| 6,101,378 A | 8/2000 | Barabush |
| 6,108,533 A | 8/2000 | Brohoff |
| 6,115,611 A | 9/2000 | Kimoto |
| 6,122,503 A | 9/2000 | Daly |
| 6,122,520 A | 9/2000 | Want |
| 6,124,810 A | 9/2000 | Segal |
| 6,131,067 A | 10/2000 | Girerd |
| 6,133,874 A | 10/2000 | Krasner |
| 6,134,316 A | 10/2000 | Kallioniemi |
| 6,134,483 A | 10/2000 | Vayanos |
| 6,138,003 A | 10/2000 | Kingdon |
| 6,148,197 A | 11/2000 | Bridges |
| 6,148,198 A | 11/2000 | Anderson |
| 6,149,353 A | 11/2000 | Nilsson |
| 6,150,980 A | 11/2000 | Krasner |
| 6,154,172 A | 11/2000 | Piccionelli |
| 6,169,516 B1 | 1/2001 | Watanabe |
| 6,169,891 B1 | 1/2001 | Gorham |
| 6,169,901 B1 | 1/2001 | Boucher |
| 6,169,902 B1 | 1/2001 | Kawamoto |
| 6,173,181 B1 | 1/2001 | Losh |
| 6,178,505 B1 | 1/2001 | Schneider |
| 6,178,506 B1 | 1/2001 | Quick, Jr. |
| 6,181,935 B1 | 1/2001 | Gossman |
| 6,181,939 B1 | 1/2001 | Ahvenainen |
| 6,182,006 B1 | 1/2001 | Meek |
| 6,182,227 B1 | 1/2001 | Blair |
| 6,185,426 B1 | 2/2001 | Alperovich |
| 6,188,354 B1 | 2/2001 | Soliman |
| 6,188,752 B1 | 2/2001 | Lesley |
| 6,188,909 B1 | 2/2001 | Alananra |
| 6,188,957 B1 | 2/2001 | Bechtolsheim |
| 6,189,098 B1 | 2/2001 | Kaliski, Jr. |
| 6,195,557 B1 | 2/2001 | Havinis |
| 6,198,431 B1 | 3/2001 | Gibson |
| 6,199,045 B1 | 3/2001 | Giniger |
| 6,199,113 B1 | 3/2001 | Alegre |
| 6,204,844 B1 | 3/2001 | Fumarolo |
| 6,205,330 B1 | 3/2001 | Windbladh |
| 6,208,290 B1 | 3/2001 | Krasner |
| 6,208,854 B1 | 3/2001 | Roberts |
| 6,215,441 B1 | 4/2001 | Moeglein |
| 6,219,557 B1 | 4/2001 | Havinis |
| 6,223,046 B1 | 4/2001 | Hamill-Keays |
| 6,226,529 B1 | 5/2001 | Bruno |
| 6,239,742 B1 | 5/2001 | Krasner |
| 6,247,135 B1 | 6/2001 | Feague |
| 6,249,680 B1 | 6/2001 | Wax |
| 6,249,742 B1 | 6/2001 | Frriederich |
| 6,249,744 B1 | 6/2001 | Morita |
| 6,249,873 B1 | 6/2001 | Richard |
| 6,253,074 B1 | 6/2001 | Carlsson |
| 6,253,203 B1 | 6/2001 | O'Flaherty |
| 6,260,147 B1 | 7/2001 | Quick, Jr. |
| 6,266,614 B1 | 7/2001 | Alumbaugh |
| 6,275,692 B1 | 8/2001 | Skog |
| 6,275,849 B1 | 8/2001 | Ludwig |
| 6,278,701 B1 | 8/2001 | Ayyagari |
| 6,278,936 B1 | 8/2001 | Jones |
| 6,289,373 B1 | 9/2001 | Dezonno |
| 6,297,768 B1 | 10/2001 | Allen, Jr. |
| 6,307,504 B1 | 10/2001 | Sheynblat |
| 6,308,269 B2 | 10/2001 | Proidl |
| 6,313,786 B1 | 11/2001 | Sheynblat |
| 6,317,594 B1 | 11/2001 | Gossman |
| 6,317,684 B1 | 11/2001 | Roeseler |
| 6,321,091 B1 | 11/2001 | Holland |
| 6,321,092 B1 | 11/2001 | Fitch |
| 6,321,158 B1 | 11/2001 | DeLorme |
| 6,321,257 B1 | 11/2001 | Kotola |
| 6,324,542 B1 | 11/2001 | Lent |
| 6,327,473 B1 | 12/2001 | Soliman |
| 6,327,479 B1 | 12/2001 | Mikkola |
| 6,331,825 B1 | 12/2001 | Ladner |
| 6,333,919 B2 | 12/2001 | Gaffney |
| 6,360,093 B1 | 3/2002 | Ross |
| 6,360,102 B1 | 3/2002 | Havinis |
| 6,363,254 B1 | 3/2002 | Jones |
| 6,366,782 B1 | 4/2002 | Fumarolo |
| 6,366,856 B1 | 4/2002 | Johnson |
| 6,367,019 B1 | 4/2002 | Ansell |
| 6,370,389 B1 | 4/2002 | Isomursu |
| 6,377,209 B1 | 4/2002 | Krasner |
| 6,397,143 B1 | 5/2002 | Paschke |
| 6,400,314 B1 | 6/2002 | Krasner |
| 6,400,943 B1 | 6/2002 | Montoya |
| 6,400,958 B1 | 6/2002 | Isomursu |
| 6,411,254 B1 | 6/2002 | Moeglein |
| 6,415,224 B1 | 7/2002 | Wako |
| 6,421,002 B2 | 7/2002 | Krasner |
| 6,427,001 B1 | 7/2002 | Contractor |
| 6,429,808 B1 | 8/2002 | King |
| 6,433,734 B1 | 8/2002 | Krasner |
| 6,434,381 B1 | 8/2002 | Moore |
| 6,441,752 B1 | 8/2002 | Fomukong |
| 6,442,384 B1 | 8/2002 | Shah |
| 6,442,391 B1 | 8/2002 | Johansson |
| 6,449,473 B1 | 9/2002 | Raivisto |
| 6,449,476 B1 | 9/2002 | Hutchison, IV |
| 6,456,852 B2 | 9/2002 | Bar |
| 6,463,272 B1 | 10/2002 | Wallace |
| 6,466,788 B1 | 10/2002 | Carlsson |
| 6,477,150 B1 | 11/2002 | Maggenti |
| 6,504,491 B1 | 1/2003 | Christians |
| 6,505,049 B1 | 1/2003 | Dorenbosch |
| 6,510,387 B2 | 1/2003 | Fuchs |
| 6,512,922 B1 | 1/2003 | Burg |
| 6,512,930 B2 | 1/2003 | Sandegren |
| 6,515,623 B2 | 2/2003 | Johnson |
| 6,519,466 B2 | 2/2003 | Pande |
| 6,522,682 B1 | 2/2003 | Kohli |

(56) References Cited

U.S. PATENT DOCUMENTS

| | | |
|---|---|---|
| 6,526,026 B1 | 2/2003 | Menon |
| 6,529,500 B1 | 3/2003 | Pandharipande |
| 6,529,722 B1 | 3/2003 | Heinrich |
| 6,529,829 B2 | 3/2003 | Turetzky |
| 6,531,982 B1 | 3/2003 | White |
| 6,538,757 B1 | 3/2003 | Sansone |
| 6,539,200 B1 | 3/2003 | Schiff |
| 6,539,232 B2 | 3/2003 | Hendrey et al. |
| 6,539,304 B1 | 3/2003 | Chansarkar |
| 6,542,464 B1 | 4/2003 | Takeda |
| 6,542,734 B1 | 4/2003 | Abrol |
| 6,542,743 B1 | 4/2003 | Soliman |
| 6,549,522 B1 | 4/2003 | Flynn |
| 6,549,776 B1 | 4/2003 | Joong |
| 6,549,844 B1 | 4/2003 | Egberts |
| 6,556,832 B1 | 4/2003 | Soliman |
| 6,560,461 B1 | 5/2003 | fomukong |
| 6,560,534 B2 | 5/2003 | Abraham |
| 6,563,824 B1 | 5/2003 | Bhatia |
| 6,564,261 B1 | 5/2003 | Gudjonsson |
| 6,570,530 B2 | 5/2003 | Gaal |
| 6,571,095 B1 | 5/2003 | Koodli |
| 6,571,174 B2 | 5/2003 | Rigazio |
| 6,574,558 B2 | 6/2003 | Kohli |
| 6,580,390 B1 | 6/2003 | Hay |
| 6,584,552 B1 | 6/2003 | Kuno |
| 6,587,691 B1 | 7/2003 | Granstam |
| 6,594,500 B2 | 7/2003 | Bender |
| 6,597,311 B2 | 7/2003 | Sheynblat |
| 6,600,927 B2 | 7/2003 | Hamilton |
| 6,603,973 B1 | 8/2003 | Foladare |
| 6,606,495 B1 | 8/2003 | Korpi |
| 6,606,554 B2 | 8/2003 | Edge |
| 6,609,004 B1 | 8/2003 | Morse |
| 6,611,757 B2 | 8/2003 | Brodie |
| 6,618,670 B1 | 9/2003 | Chansarkar |
| 6,621,423 B1 | 9/2003 | Cooper |
| 6,621,452 B2 | 9/2003 | Knockeart |
| 6,621,810 B1 | 9/2003 | Leung |
| 6,628,233 B2 | 9/2003 | Knockeart |
| 6,633,255 B2 | 10/2003 | Krasner |
| 6,640,185 B2 | 10/2003 | Tokota |
| 6,640,213 B1 | 10/2003 | Rabe |
| 6,643,516 B1 | 11/2003 | Stewart |
| 6,650,288 B1 | 11/2003 | Pitt |
| 6,661,353 B1 | 12/2003 | Gopen |
| 6,661,372 B1 | 12/2003 | Girerd |
| 6,665,540 B2 | 12/2003 | Sih |
| 6,665,541 B1 | 12/2003 | Krasner |
| 6,665,613 B2 | 12/2003 | Duvall |
| 6,665,715 B1 | 12/2003 | Houri |
| 6,671,620 B1 | 12/2003 | Garin |
| 6,677,894 B2 | 1/2004 | Sheynblat |
| 6,680,694 B1 | 1/2004 | Knockeart |
| 6,687,504 B1 | 2/2004 | Raith |
| 6,691,019 B2 | 2/2004 | Seeley |
| 6,694,258 B2 | 2/2004 | Johnson |
| 6,697,629 B1 | 2/2004 | Grilli |
| 6,698,195 B1 | 3/2004 | Hellinger |
| 6,701,144 B2 | 3/2004 | Kirbas |
| 6,703,971 B2 | 3/2004 | Pande |
| 6,703,972 B2 | 3/2004 | Van Diggelen |
| 6,704,651 B2 | 3/2004 | Van Diggelen |
| 6,707,421 B1 | 3/2004 | Drury |
| 6,714,793 B1 | 3/2004 | Carey |
| 6,718,174 B2 | 4/2004 | Vayanos |
| 6,720,915 B2 | 4/2004 | Sheynblat |
| 6,721,578 B2 | 4/2004 | Minear |
| 6,721,652 B1 | 4/2004 | Sanqunetti |
| 6,721,716 B1 | 4/2004 | Gross |
| 6,721,871 B2 | 4/2004 | Piispanen |
| 6,724,342 B2 | 4/2004 | Bloebaum |
| 6,725,159 B2 | 4/2004 | Krasner |
| 6,728,701 B1 | 4/2004 | Stoica |
| 6,731,940 B1 | 5/2004 | Nagendran |
| 6,734,821 B2 | 5/2004 | Van Diggelen |
| 6,738,013 B2 | 5/2004 | Orler |
| 6,738,800 B1 | 5/2004 | Aquilon |
| 6,741,842 B2 | 5/2004 | Goldberg |
| 6,744,856 B2 | 6/2004 | Karnik |
| 6,744,858 B1 | 6/2004 | Ryan |
| 6,745,038 B2 | 6/2004 | Callaway, Jr. |
| 6,747,596 B2 | 6/2004 | Orler |
| 6,748,195 B1 | 6/2004 | Phillips |
| 6,751,464 B1 | 6/2004 | Burg |
| 6,756,938 B2 | 6/2004 | Zhao |
| 6,757,266 B1 | 6/2004 | Hundscheidt |
| 6,757,544 B2 | 6/2004 | Rangarajan |
| 6,757,545 B2 | 6/2004 | Nowak |
| 6,766,174 B1 | 7/2004 | Kenyon |
| 6,771,639 B1 | 8/2004 | Holden |
| 6,771,742 B2 | 8/2004 | McCalmont |
| 6,772,340 B1 | 8/2004 | Peinado |
| 6,775,267 B1 | 8/2004 | Kung |
| 6,775,534 B2 | 8/2004 | Lindgren |
| 6,775,655 B1 | 8/2004 | Peinado |
| 6,775,802 B2 | 8/2004 | Gaal |
| 6,778,136 B2 | 8/2004 | Gronemeyer |
| 6,778,885 B2 | 8/2004 | Agashe |
| 6,781,963 B2 | 8/2004 | Crockett |
| 6,788,249 B1 | 9/2004 | Farmer |
| 6,795,444 B1 | 9/2004 | Vo |
| 6,795,699 B1 | 9/2004 | McCraw |
| 6,799,049 B1 | 9/2004 | Zellner |
| 6,799,050 B1 | 9/2004 | Krasner |
| 6,801,159 B2 | 10/2004 | Swope |
| 6,801,850 B1 | 10/2004 | Wolfson |
| 6,804,524 B1 | 10/2004 | Vandermaijden |
| 6,807,534 B1 | 10/2004 | Erickson |
| 6,810,323 B1 | 10/2004 | Bullock |
| 6,810,405 B1 | 10/2004 | LaRue |
| 6,813,264 B2 | 11/2004 | Vassilovski |
| 6,813,501 B2 | 11/2004 | Kinnunen |
| 6,813,560 B2 | 11/2004 | Van Diggelen |
| 6,816,111 B2 | 11/2004 | Krasner |
| 6,816,710 B2 | 11/2004 | Krasner |
| 6,816,719 B1 | 11/2004 | Heinonen |
| 6,816,734 B2 | 11/2004 | Wong |
| 6,816,782 B1 | 11/2004 | Walters |
| 6,819,919 B1 | 11/2004 | Tanaka |
| 6,820,269 B2 | 11/2004 | Kogan |
| 6,829,475 B1 | 12/2004 | Lee |
| 6,829,532 B2 | 12/2004 | Obradovich |
| 6,832,373 B2 | 12/2004 | O'Neill |
| 6,839,020 B2 | 1/2005 | Geier |
| 6,839,021 B2 | 1/2005 | Sheynblat |
| 6,839,417 B2 | 1/2005 | Weisman |
| 6,839,630 B2 | 1/2005 | Sakamoto |
| 6,842,696 B2 | 1/2005 | Silvester |
| 6,842,715 B1 | 1/2005 | Gaal |
| 6,845,321 B1 | 1/2005 | Kerns |
| 6,847,822 B1 | 1/2005 | Dennison |
| 6,853,916 B2 | 2/2005 | Fuchs |
| 6,856,282 B2 | 2/2005 | Mauro |
| 6,861,980 B1 | 3/2005 | Rowitch |
| 6,865,171 B1 | 3/2005 | Nilsson |
| 6,865,395 B2 | 3/2005 | Riley |
| 6,867,733 B2 | 3/2005 | Sandhu |
| 6,867,734 B2 | 3/2005 | Voor |
| 6,873,854 B2 | 3/2005 | Crockett |
| 6,882,850 B2 | 4/2005 | McConnell et al. |
| 6,885,874 B2 | 4/2005 | Grube |
| 6,885,940 B2 | 4/2005 | Brodie |
| 6,888,497 B2 | 5/2005 | King |
| 6,888,932 B2 | 5/2005 | Snip |
| 6,895,238 B2 | 5/2005 | Newell |
| 6,895,249 B2 | 5/2005 | Gaal |
| 6,895,329 B1 | 5/2005 | Wolfson |
| 6,898,516 B2 | 5/2005 | Pechatnikov |
| 6,900,758 B1 | 5/2005 | Mann |
| 6,903,684 B1 | 6/2005 | Simic |
| 6,904,029 B2 | 6/2005 | Fors |
| 6,907,224 B2 | 6/2005 | Younis |
| 6,907,238 B2 | 6/2005 | Leung |

(56) References Cited

U.S. PATENT DOCUMENTS

| | | |
|---|---|---|
| 6,910,818 B2 | 6/2005 | McLoone |
| 6,912,230 B1 | 6/2005 | Salkini |
| 6,912,395 B2 | 6/2005 | Benes |
| 6,912,545 B1 | 6/2005 | Lundy |
| 6,915,208 B2 | 7/2005 | Garin |
| 6,917,331 B2 | 7/2005 | Gronemeyer |
| 6,925,603 B1 | 8/2005 | Naito |
| 6,930,634 B2 | 8/2005 | Peng |
| 6,934,705 B2 | 8/2005 | Tu |
| 6,937,187 B2 | 8/2005 | Van Diggelen |
| 6,937,872 B2 | 8/2005 | Krasner |
| 6,940,950 B2 | 9/2005 | Dickinson et al |
| 6,941,144 B2 | 9/2005 | Stein |
| 6,944,535 B2 | 9/2005 | Iwata |
| 6,944,540 B2 | 9/2005 | King |
| 6,947,772 B2 | 9/2005 | Minear |
| 6,950,058 B1 | 9/2005 | Davis |
| 6,957,068 B2 | 10/2005 | Hutchison |
| 6,957,073 B2 | 10/2005 | Bye |
| 6,961,562 B2 | 11/2005 | Ross |
| 6,963,557 B2 | 11/2005 | Knox |
| 6,963,748 B2 | 11/2005 | Chithambaram |
| 6,965,754 B2 | 11/2005 | King |
| 6,965,767 B2 | 11/2005 | Maggenti |
| 6,968,044 B2 | 11/2005 | Beason |
| 6,970,871 B1 | 11/2005 | Rayburn |
| 6,970,917 B1 | 11/2005 | Kushwaha |
| 6,973,320 B2 | 12/2005 | Brown |
| 6,975,266 B2 | 12/2005 | Abraham |
| 6,978,453 B2 | 12/2005 | Rao |
| 6,980,816 B1 | 12/2005 | Rohler |
| 6,985,747 B2 | 1/2006 | Chithambaram |
| 6,990,081 B2 | 1/2006 | Schaefer |
| 6,993,355 B1 | 1/2006 | Pershan |
| 6,996,720 B1 | 2/2006 | DeMello |
| 6,999,782 B2 | 2/2006 | Shaughnessy |
| 7,024,321 B1 | 4/2006 | Deninger |
| 7,024,393 B1 | 4/2006 | Peinado |
| 7,047,411 B1 | 5/2006 | DeMello |
| 7,058,506 B2 | 6/2006 | Kawase |
| 7,065,351 B2 | 6/2006 | Carter |
| 7,065,507 B2 | 6/2006 | Mohammed |
| 7,072,667 B2 | 7/2006 | Olrik |
| 7,079,857 B2 | 7/2006 | Maggenti |
| 7,089,110 B2 | 8/2006 | Pechatnikov |
| 7,092,385 B2 | 8/2006 | Gallant |
| 7,103,018 B1 | 9/2006 | Hansen |
| 7,103,574 B1 | 9/2006 | Peinado |
| 7,106,717 B2 | 9/2006 | Rosseau |
| 7,110,773 B1 | 9/2006 | Wallace |
| 7,136,466 B1 | 11/2006 | Gao |
| 7,136,838 B1 | 11/2006 | Peinado |
| 7,142,163 B2 | 11/2006 | Connor |
| 7,142,196 B1 | 11/2006 | Connor |
| 7,142,205 B2 | 11/2006 | Chithambaram |
| 7,145,900 B2 | 12/2006 | Nix |
| 7,151,946 B2 | 12/2006 | Maggenti |
| 7,167,187 B2 | 1/2007 | Scott |
| 7,171,220 B2 | 1/2007 | Belcea |
| 7,171,304 B2 | 1/2007 | Wako |
| 7,177,397 B2 | 2/2007 | Mccalmont |
| 7,177,398 B2 | 2/2007 | Meer |
| 7,177,399 B2 | 2/2007 | Dawson |
| 7,184,418 B1 | 2/2007 | Baba |
| 7,200,380 B2 | 4/2007 | Havlark |
| 7,202,801 B2 | 4/2007 | Chou |
| 7,209,758 B1 | 4/2007 | Moll |
| 7,209,969 B2 | 4/2007 | Lahti |
| 7,218,940 B2 | 5/2007 | Niemenna |
| 7,221,959 B2 | 5/2007 | Lindquist |
| 7,245,900 B1 | 7/2007 | Lamb |
| 7,245,910 B2 | 7/2007 | Osmo |
| 7,260,186 B2 | 8/2007 | Zhu |
| 7,260,384 B2 | 8/2007 | Bales |
| 7,266,376 B2 | 9/2007 | Nakagawa |
| 7,286,929 B2 | 10/2007 | Staton |
| 7,330,899 B2 | 2/2008 | Wong |
| 7,333,480 B1 | 2/2008 | Clarke |
| 7,340,241 B2 | 3/2008 | Rhodes |
| 7,369,508 B2 | 5/2008 | Parantainen |
| 7,369,530 B2 | 5/2008 | Keagy |
| 7,424,293 B2 | 9/2008 | Zhu |
| 7,426,380 B2 | 9/2008 | Hines |
| 7,428,571 B2 | 9/2008 | Ichimura |
| 7,436,785 B1 | 10/2008 | McMullen |
| 7,440,442 B2 | 10/2008 | Grabelsky |
| 7,450,951 B2 | 11/2008 | Vimpari |
| 7,453,990 B2 | 11/2008 | Welenson |
| 7,477,903 B2 | 1/2009 | Wilcock |
| 7,495,608 B1 | 2/2009 | Chen |
| 7,522,581 B2 | 4/2009 | Acharya |
| 7,565,157 B1 | 7/2009 | Ortega |
| 7,602,886 B1 | 10/2009 | Beech |
| 7,623,447 B1 | 11/2009 | Faccin |
| 7,627,331 B2 | 12/2009 | Winterbottom |
| 7,653,544 B2 | 1/2010 | Bradley |
| 7,660,321 B2 | 2/2010 | Cortes |
| 7,702,081 B1 | 4/2010 | Klesper |
| 7,711,094 B1 | 5/2010 | Olshansky |
| 7,739,033 B2 | 6/2010 | Murata |
| 7,747,258 B2 | 6/2010 | Farmer |
| 7,751,614 B2 | 7/2010 | Funakura |
| 7,774,003 B1 | 8/2010 | Ortega |
| 7,783,297 B2 | 8/2010 | Ishii |
| 7,822,823 B2 | 10/2010 | Jhanji |
| 7,881,233 B2 | 2/2011 | Bieselin |
| 7,881,730 B2 | 2/2011 | Sheha |
| 7,895,263 B1 | 2/2011 | Kirchmeier |
| 7,937,067 B2 | 5/2011 | Maier |
| 2001/0011247 A1 | 8/2001 | O'Flaherty |
| 2001/0015756 A1 | 8/2001 | Wilcock |
| 2001/0016849 A1 | 8/2001 | Squibbs |
| 2001/0051525 A1* | 12/2001 | Rayne ............ H04W 8/085 455/453 |
| 2002/0019698 A1* | 2/2002 | Vilppula ............ G01S 5/0257 702/150 |
| 2002/0032036 A1 | 3/2002 | Nakajima |
| 2002/0037735 A1 | 3/2002 | Maggenti |
| 2002/0042260 A1* | 4/2002 | Saucedo ............ H04W 4/22 455/404.2 |
| 2002/0052214 A1 | 5/2002 | Maggenti |
| 2002/0061760 A1 | 5/2002 | Maggenti |
| 2002/0069239 A1 | 6/2002 | Katada |
| 2002/0069529 A1 | 6/2002 | Wieres |
| 2002/0077083 A1 | 6/2002 | Zellner |
| 2002/0077084 A1 | 6/2002 | Zellner |
| 2002/0077118 A1 | 6/2002 | Zellner |
| 2002/0077897 A1 | 6/2002 | Zellner |
| 2002/0085538 A1 | 7/2002 | Leung |
| 2002/0086683 A1 | 7/2002 | Kohar |
| 2002/0102996 A1 | 8/2002 | Jenkins |
| 2002/0102999 A1 | 8/2002 | Maggenti |
| 2002/0103898 A1 | 8/2002 | Moyer |
| 2002/0111172 A1 | 8/2002 | DeWolf |
| 2002/0112047 A1 | 8/2002 | Kushwaha |
| 2002/0118650 A1 | 8/2002 | Jagadeesan |
| 2002/0123327 A1 | 9/2002 | Vataja |
| 2002/0123354 A1* | 9/2002 | Nowak ............ H04W 4/22 455/456.2 |
| 2002/0126656 A1 | 9/2002 | Park |
| 2002/0130906 A1 | 9/2002 | Miyaki |
| 2002/0158777 A1 | 10/2002 | Flick |
| 2002/0164998 A1 | 11/2002 | Younis |
| 2002/0169539 A1 | 11/2002 | Menard |
| 2002/0173317 A1 | 11/2002 | Nykanen |
| 2002/0191595 A1 | 12/2002 | Mar |
| 2003/0009277 A1 | 1/2003 | Fan |
| 2003/0009602 A1 | 1/2003 | Jacobs |
| 2003/0012148 A1 | 1/2003 | Peters |
| 2003/0013449 A1 | 1/2003 | Hose |
| 2003/0014487 A1 | 1/2003 | Iwakawa |
| 2003/0016804 A1 | 1/2003 | Sheha |
| 2003/0026245 A1 | 2/2003 | Ejzak |
| 2003/0032448 A1 | 2/2003 | Bulthuis |

(56) References Cited

U.S. PATENT DOCUMENTS

| | | |
|---|---|---|
| 2003/0036848 A1 | 2/2003 | Sheha |
| 2003/0036949 A1 | 2/2003 | Kaddeche |
| 2003/0037163 A1 | 2/2003 | Kitada |
| 2003/0040272 A1 | 2/2003 | Lelievre |
| 2003/0045327 A1 | 3/2003 | Kobayashi |
| 2003/0054835 A1 | 3/2003 | Gutowski |
| 2003/0060938 A1 | 3/2003 | Duvall |
| 2003/0065788 A1 | 4/2003 | Salomaki |
| 2003/0072318 A1 | 4/2003 | Lam |
| 2003/0078054 A1 | 4/2003 | Okuda |
| 2003/0078064 A1 | 4/2003 | Chan |
| 2003/0081557 A1 | 5/2003 | Mettala |
| 2003/0096623 A1 | 5/2003 | Kim |
| 2003/0101329 A1 | 5/2003 | Lahti |
| 2003/0101341 A1 | 5/2003 | Kettler |
| 2003/0103484 A1 | 6/2003 | Oommen |
| 2003/0108176 A1 | 6/2003 | Kung |
| 2003/0109245 A1 | 6/2003 | McCalmont |
| 2003/0114157 A1 | 6/2003 | Spitz |
| 2003/0119521 A1 | 6/2003 | Tipnis |
| 2003/0119528 A1 | 6/2003 | Pew |
| 2003/0125064 A1 | 7/2003 | Koskinen |
| 2003/0126250 A1 | 7/2003 | Jhanji |
| 2003/0137961 A1 | 7/2003 | Tsirtsis |
| 2003/0149526 A1 | 8/2003 | Zhou |
| 2003/0151501 A1 | 8/2003 | Teckchandani |
| 2003/0153340 A1 | 8/2003 | Crockett |
| 2003/0153341 A1 | 8/2003 | Crockett |
| 2003/0153342 A1 | 8/2003 | Crockett |
| 2003/0153343 A1 | 8/2003 | Crockett |
| 2003/0161298 A1 | 8/2003 | Bergman |
| 2003/0165254 A1 | 9/2003 | Chen |
| 2003/0182053 A1 | 9/2003 | Swope |
| 2003/0186709 A1 | 10/2003 | Rhodes |
| 2003/0196105 A1 | 10/2003 | Fineburg |
| 2003/0201931 A1 | 10/2003 | Durst |
| 2003/0204640 A1 | 10/2003 | Sahineja |
| 2003/0223381 A1 | 12/2003 | Schroderus |
| 2003/0231190 A1 | 12/2003 | Jawerth |
| 2003/0236618 A1 | 12/2003 | Kamikawa |
| 2004/0002326 A1 | 1/2004 | Maher |
| 2004/0002814 A1 | 1/2004 | Gogic |
| 2004/0008225 A1 | 1/2004 | Campbell |
| 2004/0021567 A1 | 2/2004 | Dunn |
| 2004/0032485 A1 | 2/2004 | Stephens |
| 2004/0041729 A1 | 3/2004 | Rowitch |
| 2004/0043775 A1 | 3/2004 | Kennedy |
| 2004/0044623 A1 | 3/2004 | Wake |
| 2004/0047342 A1 | 3/2004 | Gavish |
| 2004/0047461 A1 | 3/2004 | Weisman et al. |
| 2004/0054428 A1 | 3/2004 | Sheha |
| 2004/0068724 A1 | 4/2004 | Gardner |
| 2004/0076277 A1 | 4/2004 | Kuusinen |
| 2004/0098497 A1 | 5/2004 | Banet |
| 2004/0124977 A1 | 7/2004 | Biffar |
| 2004/0132465 A1 | 7/2004 | Mattila |
| 2004/0146040 A1 | 7/2004 | Phan-Anh |
| 2004/0181689 A1 | 9/2004 | Kiyoto |
| 2004/0184584 A1 | 9/2004 | McCalmont |
| 2004/0186880 A1 | 9/2004 | Yamamoto |
| 2004/0190497 A1 | 9/2004 | Knox |
| 2004/0198332 A1 | 10/2004 | Lundsgaard |
| 2004/0198375 A1 | 10/2004 | Schwengler |
| 2004/0198386 A1 | 10/2004 | Dupray |
| 2004/0204829 A1 | 10/2004 | Endo |
| 2004/0204847 A1 | 10/2004 | Yanai |
| 2004/0205151 A1 | 10/2004 | Sprigg |
| 2004/0205517 A1 | 10/2004 | Lampert |
| 2004/0220957 A1 | 11/2004 | McDonough |
| 2004/0229632 A1 | 11/2004 | Flynn |
| 2004/0242238 A1 | 12/2004 | Wang |
| 2004/0267445 A1 | 12/2004 | De Luca |
| 2005/0027445 A1 | 2/2005 | McDonough |
| 2005/0028034 A1 | 2/2005 | Gantman |
| 2005/0031095 A1 | 2/2005 | Pietrowics |
| 2005/0039178 A1 | 2/2005 | Marolia |
| 2005/0041578 A1 | 2/2005 | Huotari |
| 2005/0043037 A1 | 2/2005 | Loppe |
| 2005/0043038 A1 | 2/2005 | Maanoja |
| 2005/0053209 A1 | 3/2005 | D'Evelyn |
| 2005/0062636 A1 | 3/2005 | Conway |
| 2005/0063519 A1 | 3/2005 | James |
| 2005/0071671 A1 | 3/2005 | Karaoguz |
| 2005/0078612 A1 | 4/2005 | Lang |
| 2005/0083911 A1 | 4/2005 | Grabelsky |
| 2005/0085999 A1 | 4/2005 | Onishi |
| 2005/0086467 A1 | 4/2005 | Asokan |
| 2005/0090236 A1 | 4/2005 | Schwinke |
| 2005/0101335 A1 | 5/2005 | Kelly |
| 2005/0107637 A1 | 5/2005 | Ball |
| 2005/0107673 A1 | 5/2005 | Ball |
| 2005/0112030 A1 | 5/2005 | Gaus |
| 2005/0119012 A1 | 6/2005 | Merheb |
| 2005/0125148 A1 | 6/2005 | Van Buer |
| 2005/0134504 A1 | 6/2005 | Harwood |
| 2005/0135569 A1 | 6/2005 | Dickinson |
| 2005/0136885 A1 | 6/2005 | Kaltsukis |
| 2005/0149430 A1 | 7/2005 | Williams |
| 2005/0159883 A1 | 7/2005 | Humphries |
| 2005/0174991 A1 | 8/2005 | Keagy |
| 2005/0190746 A1 | 9/2005 | Xiong |
| 2005/0190892 A1 | 9/2005 | Dawson |
| 2005/0192822 A1 | 9/2005 | Hartenstein |
| 2005/0201528 A1 | 9/2005 | Meer |
| 2005/0201529 A1 | 9/2005 | Nelson |
| 2005/0209995 A1 | 9/2005 | Aksu |
| 2005/0213716 A1 | 9/2005 | Zhu |
| 2005/0219067 A1 | 10/2005 | Chung |
| 2005/0232252 A1 | 10/2005 | Hoover |
| 2005/0239458 A1 | 10/2005 | Hurtta |
| 2005/0242168 A1 | 11/2005 | Tesavis |
| 2005/0255857 A1 | 11/2005 | Kim |
| 2005/0259675 A1 | 11/2005 | Tuohino |
| 2005/0261002 A1 | 11/2005 | Cheng |
| 2005/0265318 A1 | 12/2005 | Khartabil |
| 2005/0271029 A1 | 12/2005 | Iffland |
| 2005/0282518 A1 | 12/2005 | D'Evelyn |
| 2005/0287979 A1 | 12/2005 | Rollender |
| 2005/0289097 A1 | 12/2005 | Trossen |
| 2006/0008065 A1 | 1/2006 | Longman et al. |
| 2006/0019724 A1 | 1/2006 | Bahl |
| 2006/0023747 A1 | 2/2006 | Koren et al. |
| 2006/0026288 A1 | 2/2006 | Acharya |
| 2006/0041375 A1 | 2/2006 | Witmer |
| 2006/0053225 A1 | 3/2006 | Poikselka |
| 2006/0058102 A1 | 3/2006 | Nguyen et al. |
| 2006/0068753 A1 | 3/2006 | Karpen |
| 2006/0069503 A1 | 3/2006 | Suomela |
| 2006/0072729 A1 | 4/2006 | Lee et al. |
| 2006/0074547 A1 | 4/2006 | Kaufman |
| 2006/0077911 A1 | 4/2006 | Shaffer |
| 2006/0088152 A1 | 4/2006 | Green |
| 2006/0104306 A1 | 5/2006 | Adamczkk |
| 2006/0120517 A1 | 6/2006 | Moon |
| 2006/0128395 A1 | 6/2006 | Muhonen |
| 2006/0135177 A1 | 6/2006 | Winterbottom |
| 2006/0188083 A1 | 8/2006 | Breen |
| 2006/0193447 A1 | 8/2006 | Schwartz |
| 2006/0200359 A1 | 9/2006 | Khan |
| 2006/0212558 A1 | 9/2006 | Sahinoja |
| 2006/0212562 A1 | 9/2006 | Kushwaha |
| 2006/0224752 A1 | 10/2006 | Parekh |
| 2006/0233338 A1 | 10/2006 | Venkata |
| 2006/0234639 A1 | 10/2006 | Kushwaha |
| 2006/0234698 A1 | 10/2006 | Fok |
| 2006/0239205 A1 | 10/2006 | Warren |
| 2006/0246919 A1 | 11/2006 | Park |
| 2006/0250987 A1 | 11/2006 | White |
| 2006/0258380 A1 | 11/2006 | Liebowitz |
| 2006/0259365 A1 | 11/2006 | Agarwal et al. |
| 2006/0268120 A1 | 11/2006 | Funakura |
| 2006/0270421 A1 | 11/2006 | Phillips |
| 2006/0281437 A1 | 12/2006 | Cook |
| 2006/0293024 A1 | 12/2006 | Benco |

(56) References Cited

U.S. PATENT DOCUMENTS

| | | |
|---|---|---|
| 2006/0293066 A1 | 12/2006 | Edge |
| 2007/0003024 A1 | 1/2007 | Olivier |
| 2007/0004461 A1 | 1/2007 | Bathina |
| 2007/0014282 A1 | 1/2007 | Mitchell |
| 2007/0019614 A1 | 1/2007 | Hoffman |
| 2007/0021908 A1 | 1/2007 | Jaugilas |
| 2007/0022011 A1 | 1/2007 | Altberg et al. |
| 2007/0026854 A1 | 2/2007 | Nath |
| 2007/0026871 A1 | 2/2007 | Wager |
| 2007/0027997 A1 | 2/2007 | Polk |
| 2007/0030539 A1 | 2/2007 | Nath |
| 2007/0032244 A1 | 2/2007 | Counts |
| 2007/0036139 A1 | 2/2007 | Patel |
| 2007/0049288 A1 | 3/2007 | Lamprecht |
| 2007/0054676 A1 | 3/2007 | Duan |
| 2007/0060097 A1 | 3/2007 | Edge |
| 2007/0072553 A1 | 3/2007 | Barbera |
| 2007/0081635 A1 | 4/2007 | Croak |
| 2007/0083911 A1 | 4/2007 | Madden |
| 2007/0115941 A1 | 5/2007 | Patel |
| 2007/0121601 A1 | 5/2007 | Kikinis |
| 2007/0139411 A1 | 6/2007 | Jawerth |
| 2007/0149166 A1 | 6/2007 | Turcotte |
| 2007/0149213 A1 | 6/2007 | Lamba |
| 2007/0162228 A1 | 7/2007 | Mitchell |
| 2007/0182631 A1 | 8/2007 | Berlinsky |
| 2007/0201623 A1 | 8/2007 | Hines |
| 2007/0206568 A1 | 9/2007 | Silver |
| 2007/0206613 A1 | 9/2007 | Silver |
| 2007/0208687 A1 | 9/2007 | O'Connor |
| 2007/0242660 A1 | 10/2007 | Xu |
| 2007/0253429 A1 | 11/2007 | James |
| 2007/0254625 A1 | 11/2007 | Edge |
| 2007/0263610 A1 | 11/2007 | Mitchell |
| 2007/0270164 A1 | 11/2007 | Maier |
| 2007/0291733 A1 | 12/2007 | Doran |
| 2008/0032703 A1 | 2/2008 | Krumm |
| 2008/0037715 A1 | 2/2008 | Prozeniuk |
| 2008/0045250 A1 | 2/2008 | Hwang |
| 2008/0063153 A1 | 3/2008 | Krivorot |
| 2008/0065775 A1 | 3/2008 | Polk |
| 2008/0077324 A1 | 3/2008 | Hatano |
| 2008/0117859 A1 | 5/2008 | Shahidi |
| 2008/0129475 A1 | 6/2008 | Breed |
| 2008/0162637 A1 | 7/2008 | Adamczyk |
| 2008/0176582 A1 | 7/2008 | Ghai |
| 2008/0186164 A1 | 8/2008 | Emigh |
| 2008/0195314 A1 | 8/2008 | Green |
| 2008/0200182 A1 | 8/2008 | Shim |
| 2008/0214202 A1 | 9/2008 | Toomey |
| 2008/0220747 A1 | 9/2008 | Ashkenazi |
| 2008/0288166 A1 | 11/2008 | Onishi |
| 2009/0003535 A1 | 1/2009 | Grabelsky |
| 2009/0067417 A1 | 3/2009 | Kalavade |
| 2009/0097450 A1 | 4/2009 | Wallis |
| 2009/0113346 A1 | 4/2009 | Wickramasuriya |
| 2009/0128404 A1 | 5/2009 | Martino |
| 2009/0177557 A1 | 7/2009 | Klein |
| 2009/0224931 A1 | 9/2009 | Dietz |
| 2009/0298488 A1 | 12/2009 | Snapp |
| 2009/0328163 A1 | 12/2009 | Preece |
| 2010/0003976 A1 | 1/2010 | Zhu |
| 2010/0004993 A1 | 1/2010 | Troy |
| 2010/0042592 A1 | 2/2010 | Stolz |
| 2010/0067444 A1 | 3/2010 | Faccin |
| 2010/0167760 A1 | 7/2010 | Kim |
| 2010/0188992 A1 | 7/2010 | Raleigh |
| 2010/0268848 A1 | 10/2010 | Maurya |
| 2011/0113060 A1 | 5/2011 | Martini |
| 2011/0165861 A1 | 7/2011 | Wilson et al. |

FOREIGN PATENT DOCUMENTS

| | | |
|---|---|---|
| WO | WO02/11407 | 2/2002 |
| WO | WO2004/025941 | 3/2004 |
| WO | WO2005051033 | 6/2005 |
| WO | WO2007/027166 | 3/2007 |

OTHER PUBLICATIONS

Qualcomm CDMA Technologies, LBS Control Plane Roaming—80-VD377-1NP A, 2006, pp. 1-10.

Qualcomm CDMA Technologies, MS Resident User Plane LBS Roaming—80-VC718-1 E, 2006, pp. 1-37.

3$^{rd}$ Generation Partnership Project 2, Position Determination Service Standard for Dual Mode Spread Spectrum Systems, Feb. 16, 2001, pp. i-X, 1-1-1-5, 2-1-2-2, 3-1-3-51, 4-1-4-66, A-1-A-2, B-1-B-2, C-1-C-2, D-1-D-2.

Intrado Inc., Qwest Detailed SR/ALI to MPC/GMLC Interface Specification for TCP/IP Implementation of TIA/EIA/J-STD-036 E2 with Phase I Location Description Addition, Intrado Informed Response; Apr. 2004; Issue 1.11; pp. 1-57.

Extended European Search Report from EPO in European Appl. No. 06827172.5 dated Dec. 29, 2009.

Qualcomm CDMA Technologies, LBS Control Plane/User Plane Overview—80-VD378-1NP B, 2006, pp. 1-36.

Bhalla et al, TELUS, Technology Strategy—LBS Roaming Summit, Sep. 19, 2006.

Alfredo Aguirre, Ilusacell, First and Only Carrier in Mexico with a 3G CDMA Network, 2007.

Mike McMullen, Sprint, LBS Roaming Summit, Sep. 19, 2006.

Nars Haran, U.S. Cellular, Packet Data—Roaming and LBS Overview, Nov. 2, 2007, pp. 1-15.

Location Based Services V2 Roaming Support (non proprietary), 80-V8470-2NP A, dated Jan. 27, 2005, pp. 1-56.

Yilin Ahao, Efficient and reliable date transmission for cellular and GPS based mayday systems, Nov. 1997, IEEE, IEEE Conference on Intelligent Transportation System, 1997. ITSC 97, 555-559.

Examiner's Office Letter in Japanese Patent Application No. 2006-542691 dated Sep. 7, 2009.

JP Laid-Open Gazette No. 2004-158947 (English abstract only).

JP Laid-Open Gazette No. 2007-507123 (counterpart English text US Patent Application Publication No. 2007/0054676).

T. Hattori, "Wireless Broadband Textbook," IDG Japan, Jun. 10, 2002, pp. 142-143. (no English text).

Schulzrinne et al., Emergency Services for Internet Telephony Systems draft-schulzrinne-sipping-emergency-arch, IETF Standard Working Draft, Feb. 4, 2004, 1-22.

* cited by examiner

FIG. 14

| Method 0 | Return Error -- this request cannot be satisfied. If there is an entry in the PositionXLPDB, NetworkCache, return it. |
|---|---|
| Method 1 | MAP_ProvideSubscriberInfo |
| Method 2 | MAP_AnyTimeInterrogation |
| Method 3 | MAP_MT_ForwardShortMessage<br>MAP_ProvideSubscriberInfo |
| Method 4 | MAP_SendRoutingForShortMessage<br>MAP_MT_ForwardShortMessage<br>MAP_ProvideSubscriberInfo |
| Method 5 | MAP_ProvideSubscriberLocation |
| Method 6 | MAP_SendRoutingForLCS<br>MAP_ProvideSubscriberLocation |
| Method 7 | A-GPS |
| Method 8 | If (HomeCarrierNetworkType == 3G) then MAP_SendRoutingForLCS;<br>Else then MAP_SendingRoutingforSM; |
| Method 9 | MAP_SendRoutingForShortMessage<br>MAP_MT_ForwardShortMessage<br>MAP_AnyTimeInterrogation |
| Method 10 | MAP_MT_ForwardShortMessage<br>MAP_AnyTimeInterrogation |

FIG. 15

| | |
|---|---|
| Response Time | This parameter comes from the Usher_TIF_LocationRequest. |
| Location Method | This parameter comes from the Usher_TIF_LocationRequest. |
| Terminal Capability | This parameter comes from the Usher_TIF_LocationRequest, but will not be used by H3G at product launch. |
| Position Request Type | This parameter comes from the Usher_TIF_LocationRequest. |
| MSC in Cache | This parameter comes from the Position XLFDB, NetworkCache table. |
| MSC MAP Version Home | This parameter is derived from the MSC message version numbers in the GSMProvDB, MSC table for the provSubLoc (MAP_Provide_Subscriber_Location_message). |
| Network Type | This parameter comes a configurable in TIF.cfg |
| MSC Network Type | This parameter comes from the GSMProvDB. First the MSC table is queried for the PLMN ID. Then the PLMN table is queried for the Network type. If the Network type is HOME_CARRIER, then the configurable is checked. This is the default network type for the MSC. However, this can be overridden by the following logic:<br>-if the values for the versions of all messages are zero, it is assumed the versioning for this MSC is not provisioned — the default is used.<br>If version numbers are supplied for at least some of the MAP messages:<br>-if provSubLocVersion >=3, msc network type = 3G.<br>-if 0 < provSubInfoVersion < 3, msc network type = 2G.<br>-- else, msc network type = 2.5G. |
| Roaming | This parameter comes from the GSMProvDB. First the MSC table is queried for the PLMN ID. Then the PLMN table is queried for Network Type. If the Network Type is HOME_CARRIER, roaming is false. If the Network Type is anything other than HOME_CARRIER, Roaming is true. Note that this decision can only be made once the MSC is obtained, that is, after the MAP_SendRoutingInfo_for_SM has been sent. |

FIG. 23  Scheme Selection Method 1
Cached MSC – Last Known Position – MAP Phase 2+

WIRELESS TELECOMMUNICATIONS LOCATION BASED SERVICES SCHEME SELECTION

This application is a continuation of U.S. application Ser. No. 11/730,085 entitled "Wireless TeleCommunications Location Based Services Scheme Selection", filed on Mar. 29, 2007; which is a continuation of U.S. application Ser. No. 10/379,940 entitled "Wireless TeleCommunications Location Based Services Scheme Selection", filed on Mar. 6, 2003, now U.S. Pat. No. 7,200,380; which is a continuation of Ser. No. 10/339,403, entitled "Wireless TeleCommunications Location Based Services Scheme Selection", filed on Jan. 10, 2003, now abandoned; which claims priority from U.S. Provisional Appl. No. 60/367,707, the entirety of all four of which are expressly incorporated herein by reference.

BACKGROUND OF THE INVENTION

1. Field of the Invention

This invention relates generally to wireless communication carriers. More particularly, it relates to wireless telecommunications location-based services.

2. Background of Related Art

The position of a wireless client may be used for a variety of different purposes. The position of a mobile client may be provided in response to a request for the same via a wireless network. Position or location of a wireless device (e.g., a cell phone) may be used, e.g., in a vehicle-based navigation system, or to otherwise generally display or inform a requesting party of the position of a particular wireless device.

SUMMARY OF THE INVENTION

In accordance with the principles of the present invention, a method of responding in a wireless network to a location request comprises determining a sensitivity of delay to a response to the location request. Based on the determined sensitivity, a selection is made between a cached last known position of a relevant subscriber, and newly determined position information.

In accordance with another aspect of the present invention, a method of responding in a wireless network to a location request comprises determining a sensitivity of delay to a response to the location request. Based on the determined sensitivity, a selection is made between retrieval of a cached last known position record of a relevant subscriber, if available, and a next untried selection scheme if no current position record has been retrieved.

BRIEF DESCRIPTION OF THE DRAWINGS

Features and advantages of the present invention will become apparent to those skilled in the art from the following description with reference to the drawings, in which:

FIG. 14 shows method definitions of another embodiment of the present invention.

FIG. 15 exemplary scheme selection parameters of the embodiment shown in FIG. 14.

DETAILED DESCRIPTION OF ILLUSTRATIVE EMBODIMENTS

The present invention provides an intelligent system that determines the location of a wireless mobile user by choosing selection schemes according to input parameters. The input parameters may include, e.g., a required response time, and/or a requested location method. The selection schemes may also be chosen according to the capabilities of the particular user's mobile device and the wireless network, to the availability of a navigational satellite and/or of a cached position record, to the version number of the utilized software, and/or to whether or not the mobile client is roaming. In the event that repeated tries are necessary, successive selection schemes to be tried are determined, as well as the order in which the selection schemes are to be tried.

A process according to another aspect of the present invention includes retrieving a last known position record from a cache, checking the capabilities of a serving network, and choosing an initial selection scheme according to parameters. The parameters preferably include at a minimum a required response time and a requested location method. The requested location method may include a method employing a navigational satellite.

Yet another process in accordance with another aspect of the present invention includes attempting to retrieve a current position record by an initial selection scheme. If no current position record is retrieved, successive untried selection schemes are tried in turn according to a predetermined algorithm until a current position record is returned. The last known position record is updated, or an error is returned if a current position record has not been retrieved. The last known position record is returned if an error has been returned, if the last known position record exists in the cache, and the last known position record has not expired.

In a wireless network, there are potentially several messages (e.g., Signaling System No. 7 (SS7)) messages which can be used to request and thereby obtain a subscriber's location. The particular process used to obtain the location is referred to herein as "scheme selection".

Scheme selection in accordance with the principles of the present invention determines which of a plurality of possible messages to send, as well as a preferred order in which to send them, particularly when a message fails to result in obtaining a subscriber's location.

A location services platform scheme selection service in accordance with the principles of the present invention makes an intelligent choice between multiple possible SS7 messages used to obtain a subscriber's location. In the disclosed embodiments, the choice is preferably based upon a combination of location request parameters, e.g., the subscriber's equipment capabilities, the network type, and/or the capabilities of the network.

The present invention may be implemented in any suitable location service platform.

Figure 1:
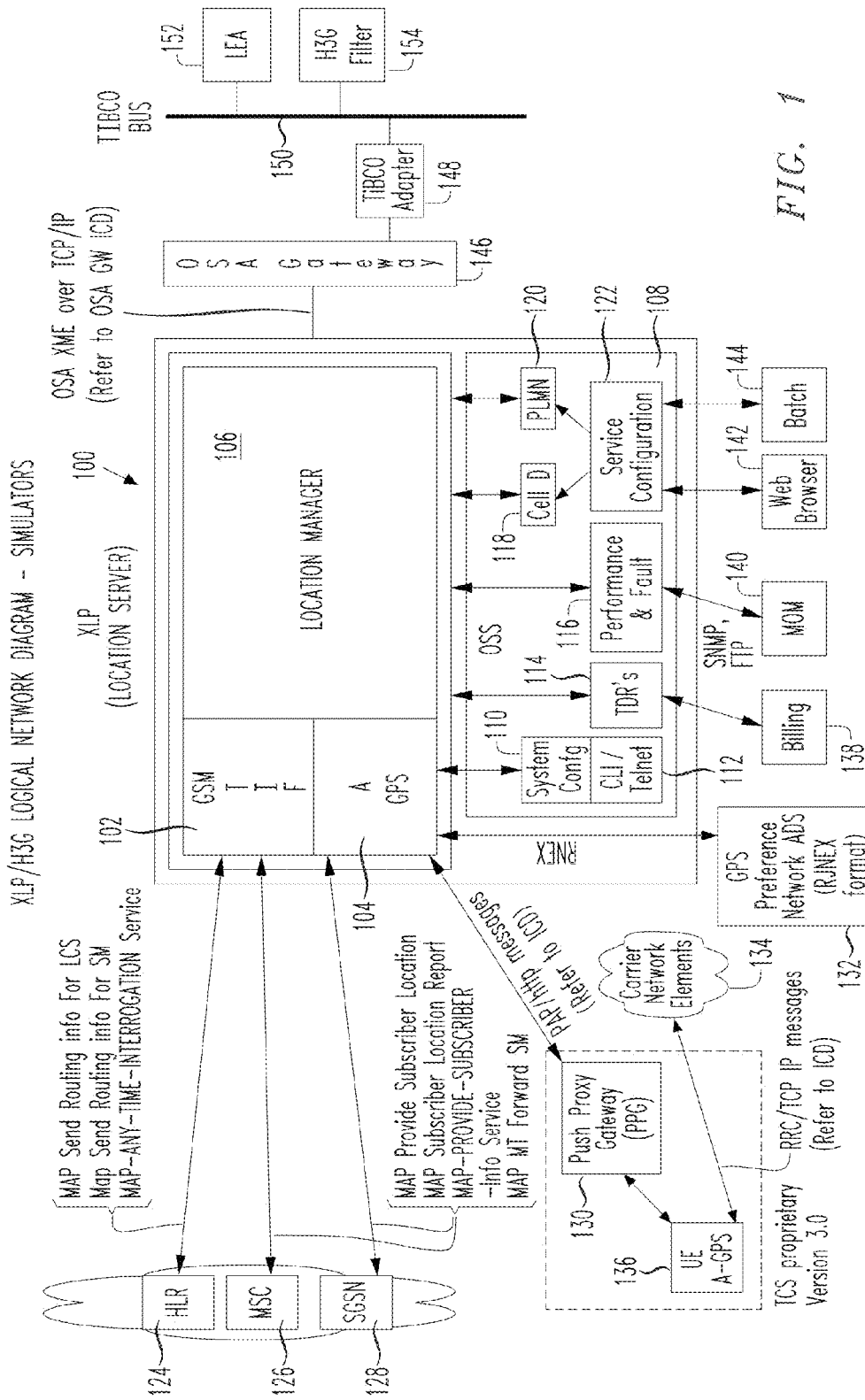
FIG. 1 shows exemplary network architecture of scheme selection in a location platform, in accordance with the principles of the present invention.

FIG. 1 shows exemplary network architecture for scheme selection in a location platform, in accordance with the principles of the present invention.

In FIG. 1, a location platform (XLP) location server 100 includes a Telecommunication InterFace (TIF) 102, an Assisted Global Positioning Satellite (Assisted GPS, or AGPS) unit 104, a location manager 106 and an Operations Support System (OSS) 108. The OSS 108 further includes system configuration means 110 with a Command Line Interface/Telnet interface 112, Transaction Detail Records (TDRs) 114, a performance and fault module 116, Cell Data 118, Public Land Mobile Network (PLMN) database 120 and service configuration means 122. TIF 102 is connected to Home Location Register (HLR) 124 and Mobile Switch Center (MSC) 126, and Assisted GPS 104 is connected to Serving GPRS Support Node (SGSN) 128 and Push Proxy Gateway (PPG) 130 and GPS reference network 132. Carrier network elements 134 are connected to XLP 100, and both carrier network elements 134 and PPG 130 are connected to User Equipment 136. Billing means 138 are connected to Transaction Detail Records (TDRs) 114. Message Oriented Middleware (MOM) 140 is connected to performance and fault module 116. Service configuration means 122 are configured to be accessed by a web browser 142 or by batch means 144. XLP 100 is also connected via OSA (Open Services Architecture) gateway 146 and adapter 148 to bus 150, which in turn is connected to Location Enterprise Application (LEA) 152.

A plurality of methods may be implemented. In one disclosed embodiment, a Xypoint™ Location Platform (XLP) Telecommunication InterFace (TIF) scheme selection function is responsible for deciding which method should be used when the XLP receives a location service request from a location application, based on the parameters of the request, and the capabilities of core network components. In addition, if a method fails, the Telecommunication InterFace (TIF) scheme selection function may also decide whether another method should be triggered, or if an error should instead be reported.

Once a method is selected, a sequence of MAP messages may be initiated by the Telecommunication InterFace (TIF) to the core network, and responses from the core network may be processed by the TIF as well, or Assisted GPS related messages will be exchanged between the XLP and the core network.

Preferably, the Home Location Register (HLR)s will support 3rd Generation Partnership Project (3GPP) Release 99 version of the Mobile Application Part (MAP). In the disclosed embodiments, the XLP uses only the Release 99 MAP version to communicate with the Home Location Register (HLR). It is assumed for the purposes of the enclosed embodiments that other network components (e.g., of roaming partners) may be compliant with MAP version 1, MAP version 2 or MAP version 3 for Phase 2+.

Location Request

Table 1 shows exemplary parameters that may be provided by an Immediate Request. The parameters are preferably passed through an Open Services Architecture (OSA) interface.

TABLE 1

Parameters of location request

| Parameter name | Notes |
| --- | --- |
| Priority | NORMAL or HIGH |
| Accuracy | Unsigned Long (radius in meters) |
| Type | CURRENT, CURRENT_OR_LAST_KNOWN, or INITIAL. |
| ResponseTime | NO_DELAY, return initial or last known; LOW_DELAY, attempt update but return best available within time constraint; DELAY_TOLERANT, get updated value; |

TABLE 1-continued

Parameters of location request

| Parameter name | Notes |
| --- | --- |
| | USE_TIMER_VALUE, get current position within response time requirement. |
| AltitudeRequested | Altitude request flag. |
| RequestedLocation Method | Network = default or AGPS |
| Timer | Time in seconds to respond used for USE_TIMER_VALUE responseTime. |

Main Process of Scheme Selection

Figure 2:
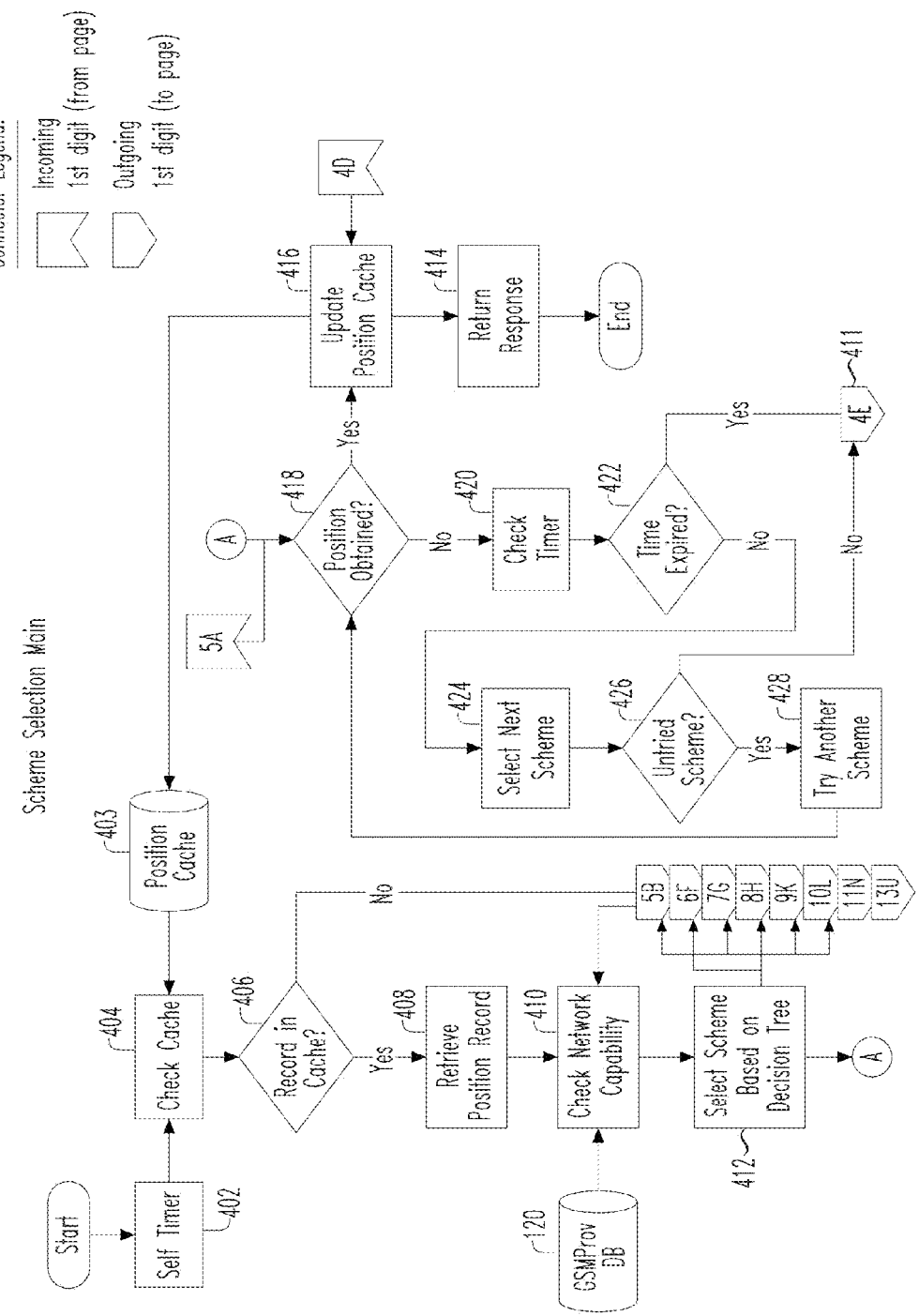
FIG. 2 shows an exemplary scheme selection main process, in accordance with the principles of the present invention.

FIG. 2 shows an exemplary scheme selection main process, in accordance with the principles of the present invention.

In particular, when receiving a location request, the Telecommunication InterFace (TIF) 102 starts a timer in step 402. The timer value is either indicated by the received request, or is set to a default value when a timer value is not provided. Based on the target subscriber identifier, Mobile Station ISDN (MSISDN), the Telecommunication InterFace (TIF) 102 checks the Position Cache database 403 in step 404 and determines whether a position record exists in step 406. If a position record exists, the Telecommunication InterFace (TIF) 102 then retrieves the record in step 408 and checks the serving network (meaning Mobile Switch Center (MSC) or Serving GPRS Support Node (SGSN)) capability in step 410 from a pre-provisioned Public Land Mobile Network (PLMN) database 120.

Figure 3:
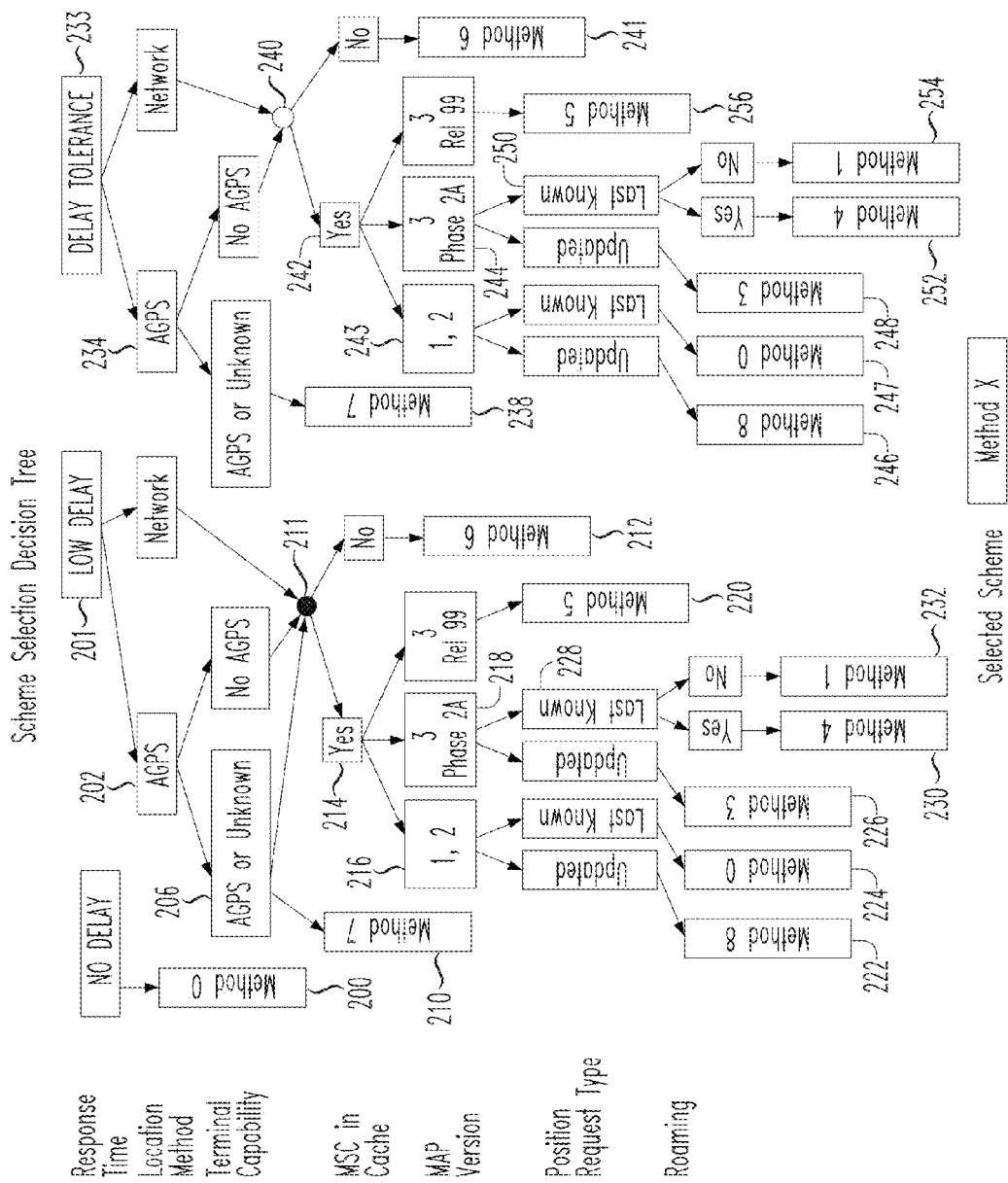
FIG. 3 shows an exemplary scheme selection decision tree, in accordance with one aspect of the present invention.
Figure 4:
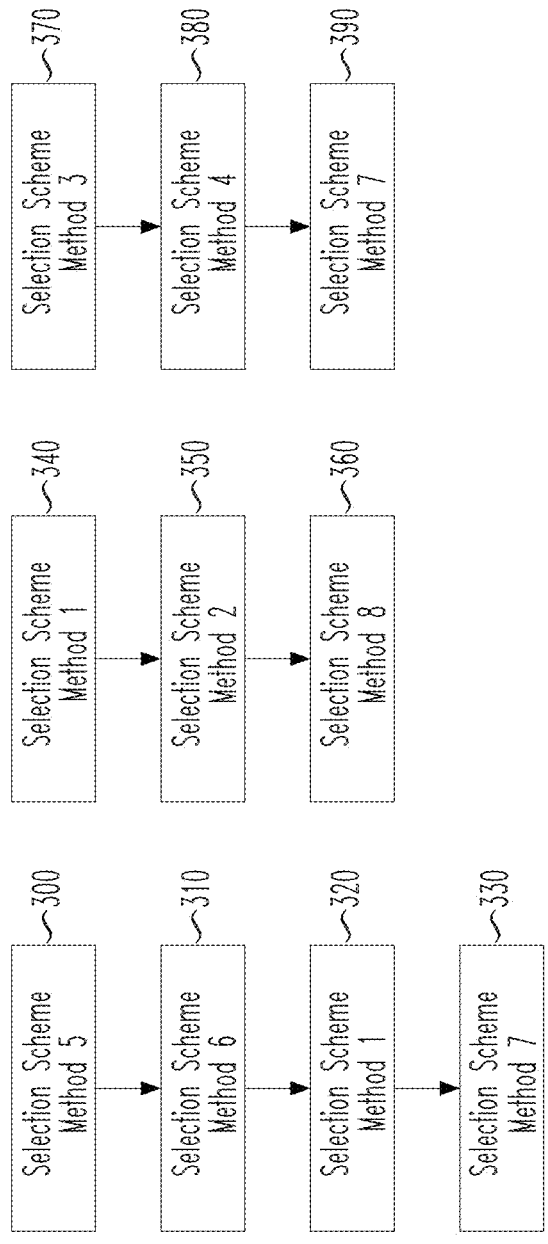
FIG. 4 shows a strategy for selecting an alternate scheme for a retry, in accordance with the principles of the present invention.

With all this information, including the request parameters and potential network capability, the Telecommunication InterFace (TIF) 102 uses the logic defined in FIG. 3 to select a method to retrieve the position information from the core network in step 412. FIG. 4 also shows the mechanism for possible retry once a method fails. FIGS. 3 and 4 will be discussed a bit further down.

In step 418 it is determined whether a position has been obtained, and if so, then the method proceeds to step 416, or if not, then in step 420 the timer is checked. In step 422, it is determined whether the timer has expired, and if not, then the next selection scheme is selected in step 424. In step 426 it is determined whether the selected scheme has been tried before, and if the scheme is untried, then in step 428 the selected scheme is tried, and then the method returns to step 418.

In a successful scenario, including the case with several retries, the Telecommunication InterFace (TIF) 102 will return the retrieved position information to the OSA (Open Services Architecture) interface in step 414, which passes to the location application. At the same time, the Telecommunication InterFace (TIF) 102 also updates the Position Cache database 403 in step 416.

In an unsuccessful scenario, in step 411 the Telecommunication InterFace (TIF) 102 will return the last known position information retrieved from the Position Cache database 403 with an error, or just an error if no cached location information is available (or the information expires).

Exemplary Scenarios

The following methods have been defined as exemplary schemes for an XLP to use to retrieve location information, either from a core network or locally from a cache database of the XLP.

Method 0: Requested position not obtainable, existing information from the cache database, if it is not expired, will be returned if available.

Method 1: Use MAP_Provide_Subscriber_Info and cached MSC-number to retrieve the requested position information.

Method 2: Use MAP_Any_Time_Interrogation to retrieve the requested position information.

Method 3: Use Mobile Terminated (MT) Short Message (refresh location information), MAP_Provide_Subscriber_Info and cached MSC-number (Mobile Switch Center-number) to retrieve the requested position information. (Phase 2+)

Method 4: When a cached MSC is not available, use MAP_Send_Routing_For_S_M to the HLR to obtain the MSC number. Then, use the mobile terminated (MT) short message to refresh location information filled by the MAP_Provide_Subscriber_Info.

Method 5: Use MAP_Provide_Subscriber_Location and cached MSC-number to retrieve the requested position information. (Release 99)

Method 6: When a cached MSC is not available, use MAP_Send_Routing for LCS to obtain the MSC number, then use MAP_Provide_Subscriber_Location to retrieve the requested position information. (Release 99)

Method 7: Use Assisted GPS (AGPS) to retrieve the requested position information. (Release 99).

Method 8: Use MAP_Send_Routing_Info_For_SM to retrieve the current MSC-number when no cached MSC-number is available.

Detailed Scheme Selection

FIG. 3 shows an exemplary scheme selection decision tree, in accordance with one aspect of the present invention.

If No Delay is required, then AGPS and core network requests are not possible, and the Method 0 is selected in step 200.

Alternatively, if Low Delay is required, then in step 201 only core network methods are selected. In step 211 the internal database 403 is queried to determine whether location information of the target subscriber is cached in the database 403. If the location information is not cached in the database 403, then in step 212 Method 6 is selected. If the location information is cached in the database 403, then in step 214 the MAP version is determined. If the MAP version is Release 99, then in step 220 Method 5 is selected. If the MAP version is 2+, then in step 218 it is determined whether the position request type is Updated. If the position request type is Updated, then in step 226 Method 3 is selected. If not, then in step 228 it is determined whether or not Roaming applies. If the mobile is roaming, then Method 9 is selected in step 230, and if not, then in step 232 Method 1 is selected. If the MAP version is other than 2+ or Release 99, then in step 216 it is determined whether the position request type is Updated. If so, then in step 222 Method 8 is selected, and if not, then in step 224 Method 0 is selected.

Similarly, if the Response Time is Delay Tolerant, then in step 233 either AGPS or Network is selected according to the requested Location Method. If AGPS was requested, then in step 234 the terminal capability is determined, and if the terminal is capable of AGPS or unknown, then in step 238 Method 7 is selected. If either Network was selected in step 233, or it was determined that the terminal capability did not include AGPS in step 234, then in step 240 the internal database 403 is queried to determine whether location information of the target subscriber is cached in the database 403. If the location information is not cached in the database 403, then in step 241 Method 6 is selected. If location information is cached in the database 403, then in step 242 the MAP version is determined. If the MAP version is Release 99, then in step 256 Method 5 is selected. If the MAP version is 2+, then in step 244 it is determined whether the position request type is Updated. If the position request type is Updated, then in step 248 Method 3 is selected. If not, then in step 250 it is determined whether or not Roaming applies. If the mobile is not roaming, then Method 4 is selected in step 252, and if not, then in step 254 Method 1 is selected. If the MAP version is other than 2+ or Release 99, then in step 243 it is determined whether the position request type is Updated. If so, then in step 246 Method 8 is selected, and if not, then in step 247 Method 0 is selected.

As discussed above, FIG. 3 presents a key concept of scheme selection. When receiving a location request the location application, firstly the Telecommunication InterFace (TIF) 102 examines the requesting parameters. Based on Accuracy and RequestedLocationMethod, the TIF 102 decides if Assisted GPS (AGPS) method (Method 7) should be used. Note that the ResponseTime and the request Type are taken into account for the decision as well, e.g. if NO-DELAY is required then the Assisted GPS (AGPS) method is not possible. If the AGPS method is not possible, or the request asks for a non-AGPS method, e.g. if RequestLocationMethod=Network, then the Telecommunication InterFace (TIF) 102 queries the internal database 403 to see if location information of the target subscriber is cached in the database 403. Note that the location information of a certain subscriber includes the serving Mobile Switch Center (MSC)/Serving GPRS Support Node (SGSN) number, and supported Mobile Application Part (MAP) version etc. Based on the MAP version and other request parameters, the Telecommunication InterFace (TIF) 102 will decide which method should be used for the request.

If there is no location information record of target User Equipment, Telecommunication InterFace (TIF) 102 will trigger Method 6 to retrieve the serving Mobile Switch Center (MSC)/Serving GPRS Support Node (SGSN) information, and assume the serving Mobile Switch Center (MSC)/Serving GPRS Support Node (SGSN) supports Release 99 Mobile Application Part (MAP) version.

Upon a failure of a certain selected method, the Telecommunication InterFace (TIF) 102 will try a different method as long as the timer for this location request transaction has not yet expired, or until a user_specified number of retries have been executed, or until no more reasonable retries remain.

FIG. 4 shows a strategy for selecting an alternate scheme for a retry, in accordance with the principles of the present invention.

In particular, as shown in FIG. 4, if the original method employed in step 300 is method 5, then successive attempts may employ, e.g., method 6 in step 310, method 1 in step 320, and method 7 in step 330. If the original method is method 1 in step 340, successive attempts may employ method 2 in step 350 and method 8 in step 360. If the original method is method 3 in step 370, successive attempts may employ method 4 in step 380 and method 7 in step 390.

Method 0

Figure 5:
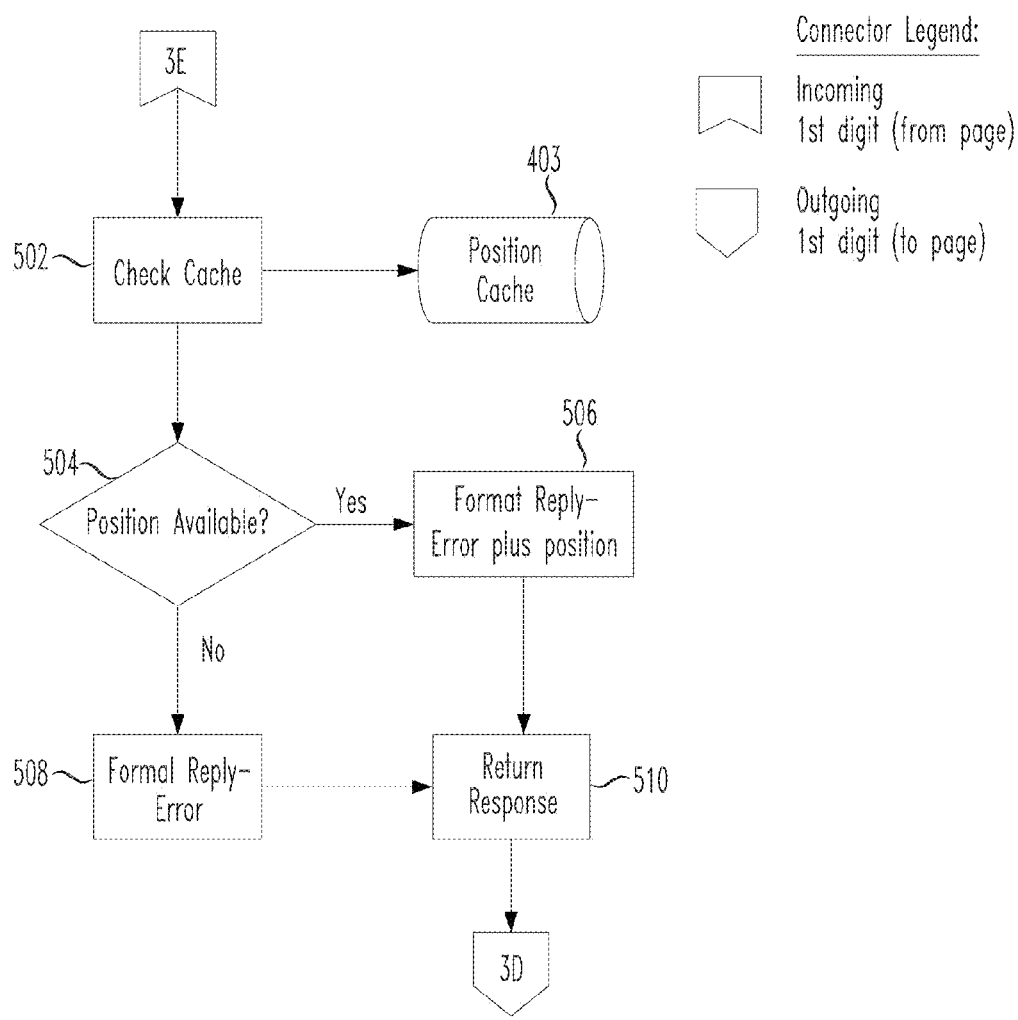
FIG. 5 shows exemplary scheme selection method 0 wherein a requested position is not obtainable, in accordance with the principles of the present invention.

FIG. 5 shows exemplary scheme selection method 0 wherein a requested position is not obtainable, in accordance with the principles of the present invention.

In particular, FIG. 5 shows the detailed procedure of method 0. Method 0 is used in the case that the requested position is not obtainable.

In step 502 the position cache database 403 is checked and in step 504 it is determined whether a position is available. If a position is available, then in step 506 a reply is formatted including an error plus a position and in step 510 a response is returned. If no position is available, then in step 508 a reply is formatted including only an error signal, and in step 510 the response is returned.

Method 1

Figure 6:
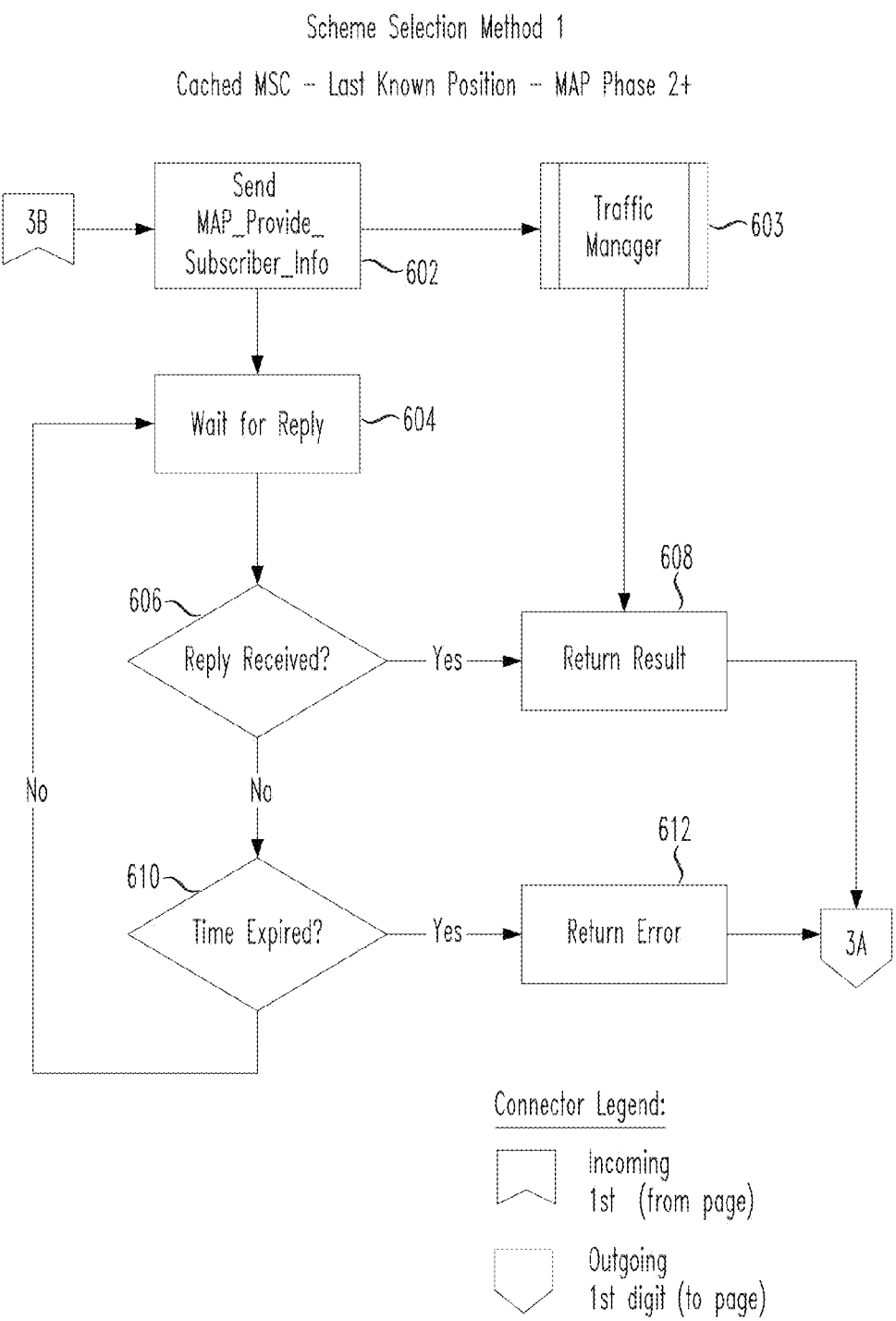
FIG. 6 shows exemplary scheme selection method 1 wherein a Telecommunication InterFace (TIF) determines that position information was previously cached, in accordance with the principles of the present invention.

FIG. 6 shows exemplary scheme selection method 1 wherein the Telecommunication InterFace (TIF) 102 determines that the position information was previously cached, in accordance with the principles of the present invention.

In particular, FIG. 6 shows the detailed procedure of method 1, which is used in the case that the Telecommunication InterFace (TIF) 102 determinates that the position information was cached before, and the serving Mobile Switch Center (MSC)/Serving GPRS Support Node (SGSN) supports the Mobile Application Part (MAP) version defined for Phase 2+.

In step 602 a signal MAP_Provide_Subscriber_Info is sent to a Traffic Manager 603, and in step 604 the TIF 102 waits for a reply. In step 606 it is determined whether a reply has been received by TIF 102, and if a reply has ben received a result is returned in step 608. If no reply has been received, it is determined in step 610 whether the timer has expired, and if the timer has expired, then an error is returned in step 612. If the timer has not expired, then the method returns to step 604.

Method 2

Figure 7:
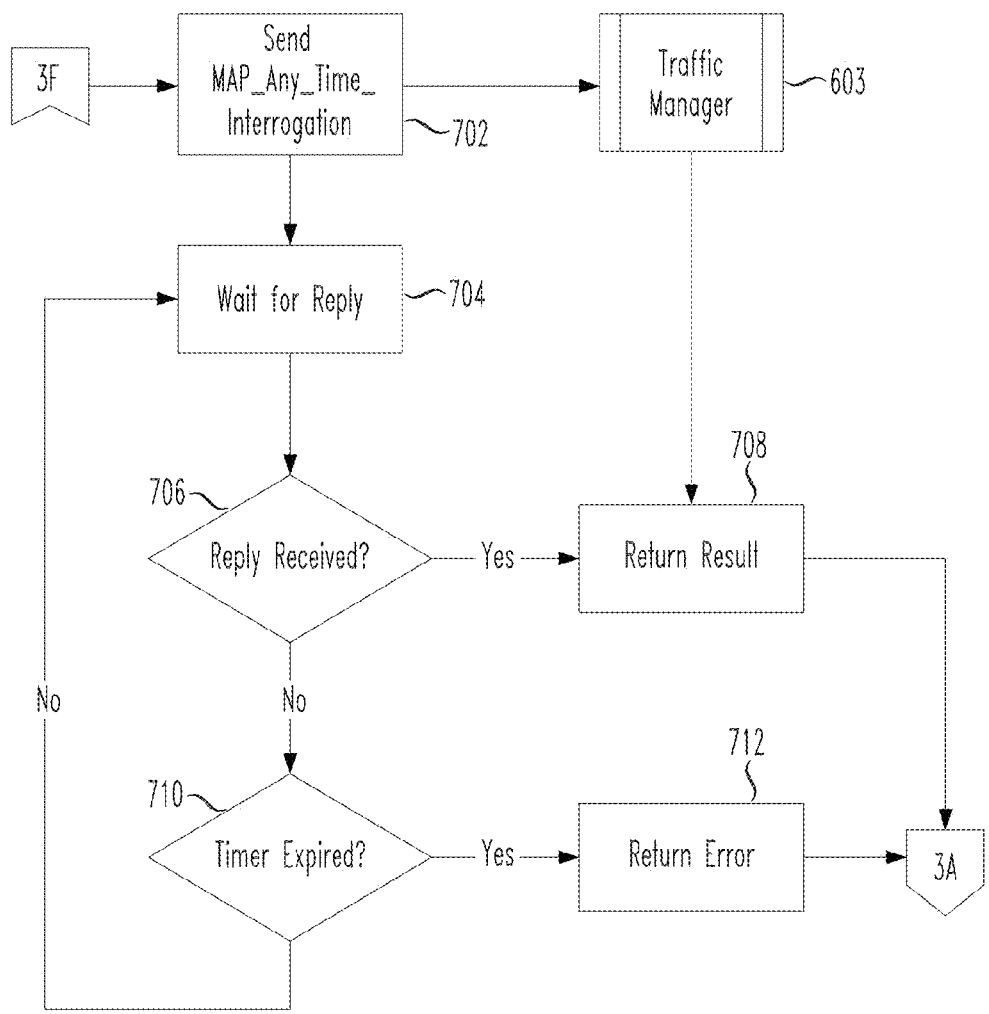
FIG. 7 shows exemplary scheme selection method 2 wherein position information of the target user equipment is not available, in accordance with the principles of the present invention.

FIG. 7 shows exemplary scheme selection method 2 wherein the position information of the target User Equipment is not available, in accordance with the principles of the present invention.

In particular, FIG. 7 shows the details of method 2, which is used in the case that the position information of the target User Equipment is not available, hence no information regarding the serving Mobile Switch Center (MSC)/Serving GPRS Support Node (SGSN) is available, and the request Type is LAST KNOWN.

In step 702 a MAP_Any_Time_Interrrogation signal is sent by the TIF 102 to the Traffic Manager 603, and in step 704 the TIF 102 waits for a reply. In step 706 it is determined whether a reply has been received, and if a reply has been received, then a result is returned in step 708. If a reply has not been received, then in step 710 it is determined whether the timer has expired, and if the timer has expired, then an error is returned in step 712. If the timer has not expired, then the method returns to step 704.

Method 3

Figure 8:
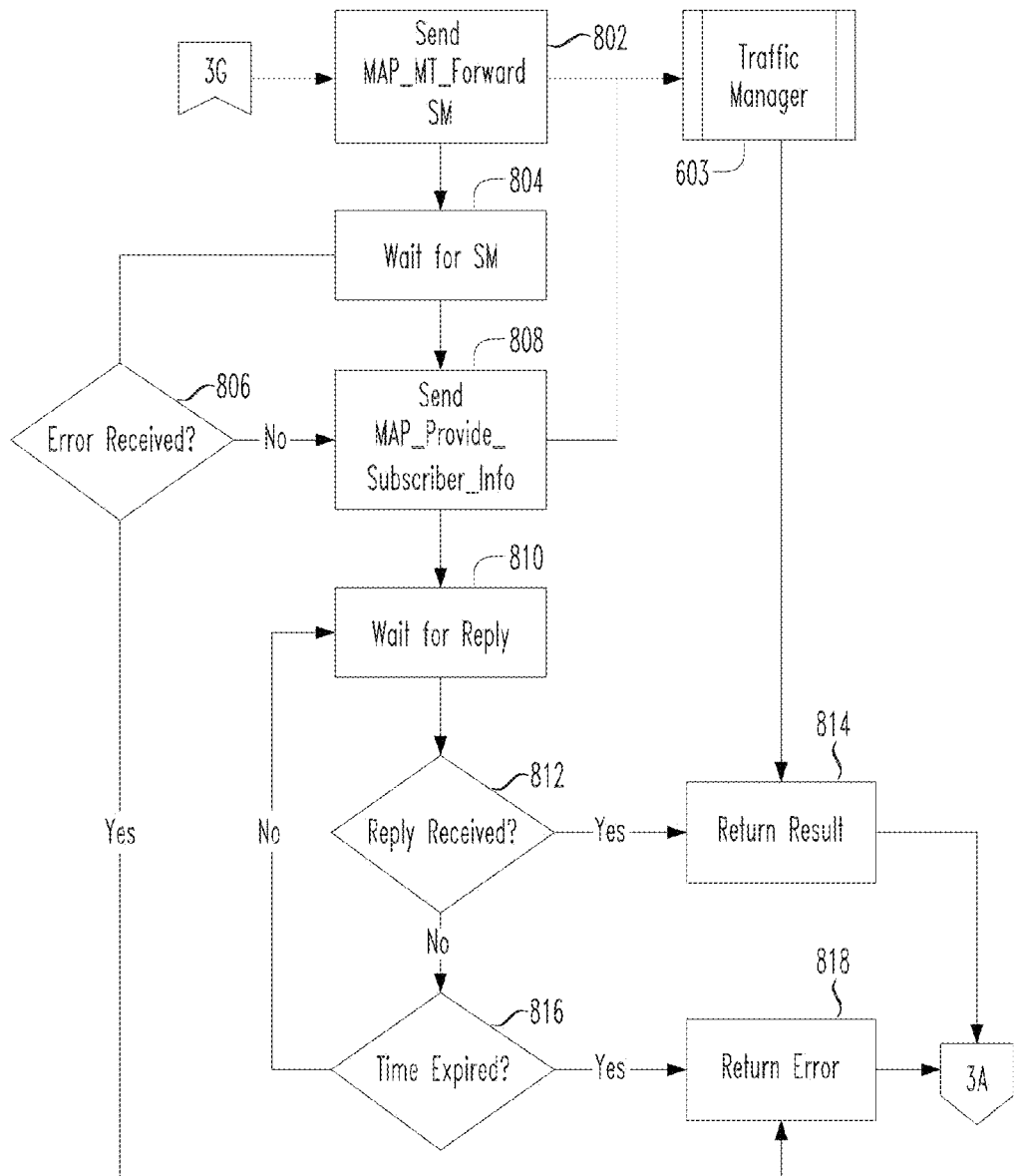
FIG. 8 shows exemplary scheme selection method 3 wherein position information of a target user equipment is available from a cache database, in accordance with the principles of the present invention.

FIG. 8 shows exemplary scheme selection method 3 wherein the position information of the target User Equipment is available from a cache database 403, in accordance with the principles of the present invention.

In particular, FIG. 8 shows the embodiment of method 3, which is used in the case that the position information of the target User Equipment is available from the cache database 403, which indicates the serving Mobile Switch Center (MSC)/Serving GPRS Support Node (SGSN) supports Mobile Application Part (MAP) version for Phase 2+, and the request type is CURRENT.

In step 802, a MAP_MT_Forward Short Message is sent by the TIF 102 to the Traffic Manager 603, and in step 804 the TIF 102 waits for a Short Message. In step 806 it is determined whether an error has been received, and if an error has been received the method jumps to step 818 to return an error. If no error has been received, then in step 808 a MAP_Provide_Subscriber_Info signal is sent, and in step 810 the TIF 102 waits for a reply. In step 812 it is determined whether a reply has been received, and if a reply has been received, then a result is returned in step 814. If no reply has been received, then in step 816 it is determined whether the timer has expired, and if the timer has expired, then in step 818 an error is returned. If the timer has not expired, then the method returns to step 810.

Method 4

Figure 9:
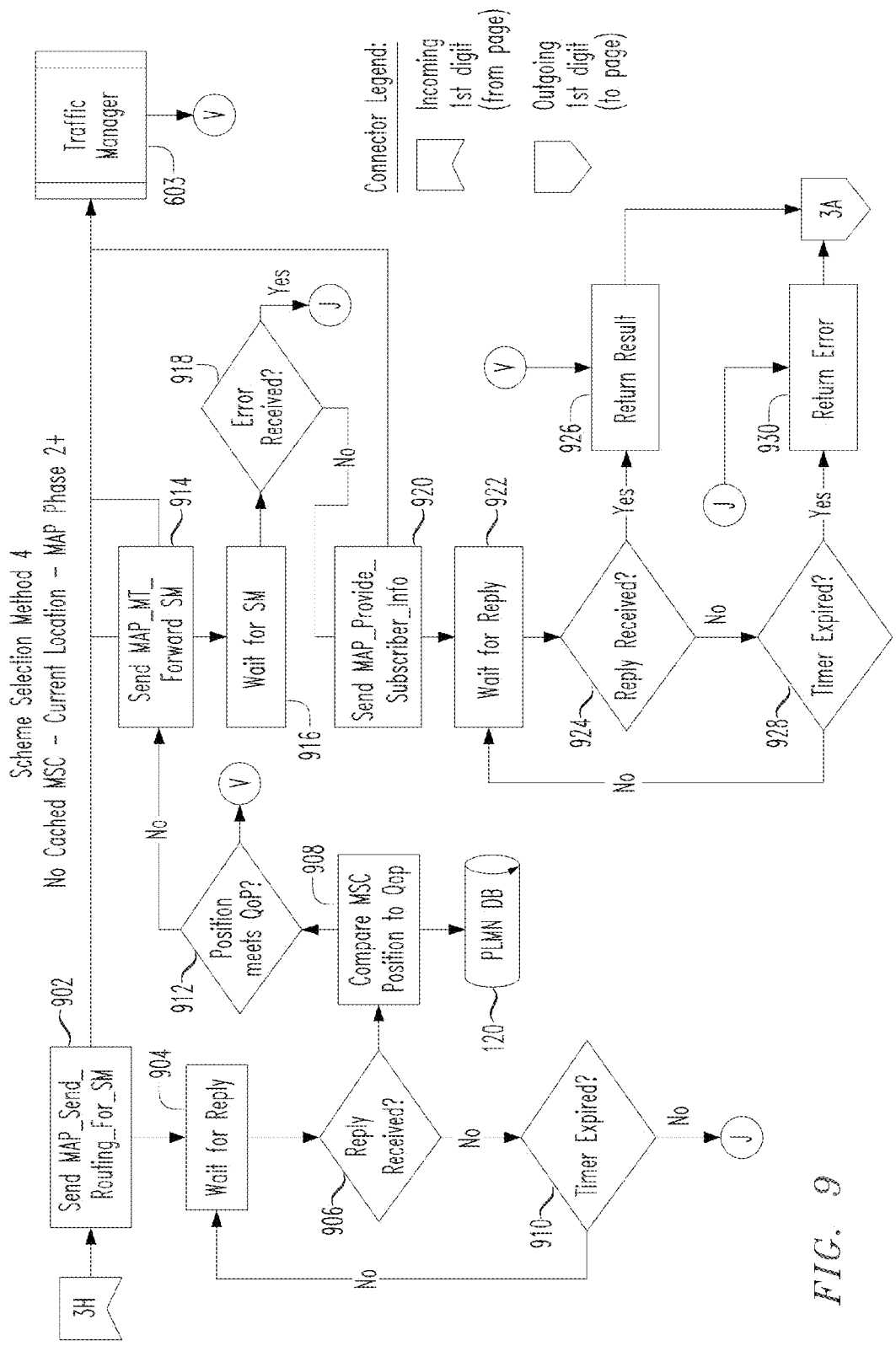
FIG. 9 shows exemplary scheme selection method 4 wherein no cached position information regarding a target user equipment is available, in accordance with the principles of the present invention.

FIG. 9 shows exemplary scheme selection method 4 wherein no cached position information regarding the target User Equipment is available, in accordance with the principles of the present invention.

In particular, FIG. 9 shows method 4, which is used in the case that no cached position information of the target User Equipment is available and the request Type is CURRENT. In this case, Telecommunication InterFace (TIF) 102 queries the Home Location Register (HLR) for the serving Mobile Switch Center (MSC) using MAP_Send_Routing_Info_For_SM, and then sends a null short message to the target User Equipment to refresh it location information in the serving Mobile Switch Center (MSC)/Visitor Location Register (VLR).

If the Mobile Terminated (MT) short message delivery is successful, the Telecommunication InterFace (TIF) 102 then initiates MAP_Provide_Subscriber_Info to retrieve the location information of the target User Equipment.

In step 902, a MAP_Send_Routing_For_SM signal is sent by the TIF 102 to the Traffic Manager 603, and in step 904 the TIF 102 waits for a reply. In step 906 it is determined whether a reply has been received, and if a reply has been received, then the MSC position is compared to the Quality of Position (QoP) in step 908 from the PLMN database 120. If a reply has not been received, then it is determined whether the timer has expired in step 910, and if the timer has expired then an error is returned in step 930. If the timer has not expired, then the method returns to step 904. On completion of step 908, it is determined whether the position meets a desired Quality of Position (QoP) in step 912, and if the position meets the desired QoP, then a result is returned in step 926. If the position does not meet the desired QoP, then a MAP_MT_Forward Short Message is sent by the TIF 102 to the Traffic Manager 603 in step 914, and the TIF 102 waits for a reply in step 916. In step 918 it is determined whether an error has been received, and if an error has been received, then an error is returned in step 930. If an error has not been received, then a MAP_Provide_Subscriber_Info signal is sent by the TIF 102 in step 920, and the TIF 102 waits for a reply in step 922. In step 924 it is determined whether a reply has been received, and if a reply has been received, then in step 926 a result is returned. If no reply has been received, then in step 928 it is determined whether the timer has expired, If the timer has expired, then in step 930 an error is returned, and if the timer has not expired, then the method returns to step 922.

Method 5

Figure 10:
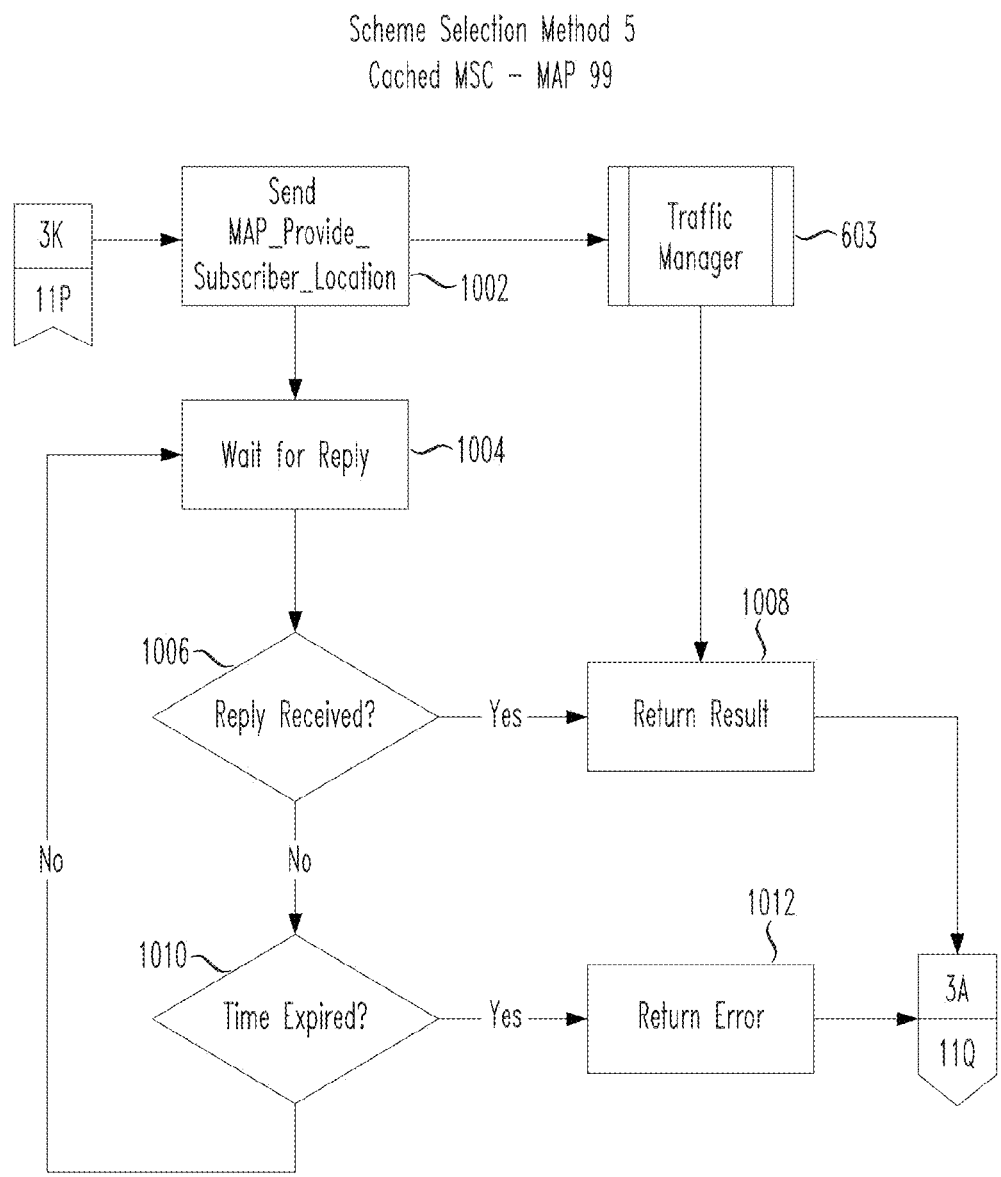
FIG. 10 shows exemplary scheme selection method 5 wherein position information is available in a cache database, in accordance with the principles of the present invention.

FIG. 10 shows exemplary scheme selection method 5 wherein position information is available in the cache database 403, in accordance with the principles of the present invention.

In particular, FIG. 10 shows the procedure details of method 5, which is used in the case that the position information is available in the cache database 403, indicating that the serving Mobile Switch Center (MSC)/Serving GPRS Support Node (SGSN) supports Release 99 Mobile Application Part (MAP) version.

In step 1002 a MAP_Provide_Subscriber_Location signal is sent by the TIF 102 to the Traffic Manager 603, and in step 1004 the TIF 102 waits for a reply. In step 1006 it is determined whether a reply has been received, and if a reply has been received, then in step 1008 a result is returned. If no reply has been received, then in step 1010 it is determined whether the timer has expired, and if the timer has expired, then in step 1012 an error is returned. If the timer has not expired, then the method returns to step 1004.

Method 6

Figure 11:
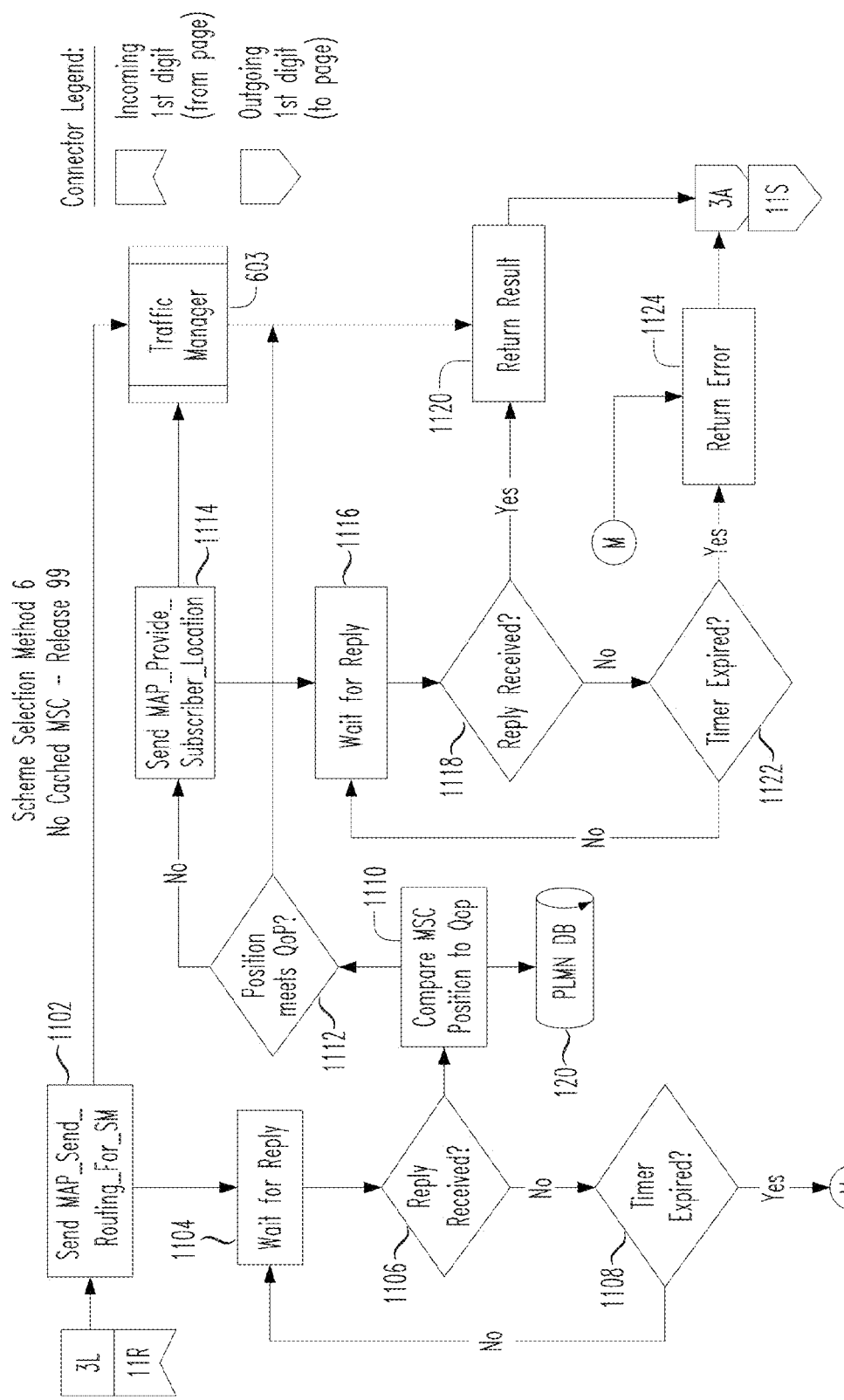
FIG. 11 shows exemplary scheme selection method 6 wherein no cached position information regarding a target subscriber is available, in accordance with the principles of the present invention.

FIG. 11 shows exemplary scheme selection method 6 wherein no cached position information regarding the target subscriber is available, in accordance with the principles of the present invention.

In particular, FIG. 11 shows method 6, which is used in the case that no cached position information of the target subscriber is available, the Telecommunication InterFace (TIF) 102 uses Release 99 Mobile Application Part (MAP) version to communicate with the various network components. Firstly the Telecommunication InterFace (TIE) 102 initiates MAP_Send_Routing_Info_For_LCS (LCS is short for LoCation Services) to retrieve the serving Mobile Switch Center (MSC)/Serving GPRS Support Node (SGSN)-number of the target User Equipment from the Home Location Register (HLR). If the original request asks for the location information higher than Mobile Switch Center (MSC)/Serving GPRS Support Node (SGSN) level, the Telecommunication InterFace (TIF) 102 uses MAP_Provide_Subscriber_Location to retrieve the location information of the target User Equipment from the Mobile Switch Center (MSC)/Serving GPRS Support Node (SGSN).

In step 1102 a MAP_Send_Routing_For_LCS signal is sent by the TIF 102 to the Traffic Manager 603, and in step 1104 the TIF 102 waits for a reply. It is determined in step 1106 whether a reply has been received, and if a reply has been received the method proceeds to step 1110. If no reply has been received, then in step 1108 it is determined whether the timer has expired, and if the timer has expired, then an error is returned in step 1124. If the timer has not expired, then the method returns to step 1104. In step 1110 the MSC position is compared to the desired Quality of Position (QoP), by means of the PLMN database 120, and in step 1112 it is determined whether the position meets the desired QoP. If the position meets the desired QoP, then a result is returned in step 1120, and if the position does not meet the desired QoP, then a Send_MAP_Provide_Subscriber_Location signal is sent in step 1114 and the TIF 102 waits for a reply in step 1116. In step 1118 it is determined whether a reply has been received, and if a reply has been received, then in step 1120 a result is returned. If a reply has not been received, then in step 1122 it is determined whether the timer has expired, and if the timer has expired, then in step 1124 an error is returned. If the timer has not expired, then the method returns to step 1116.

Method 7

Figure 12:
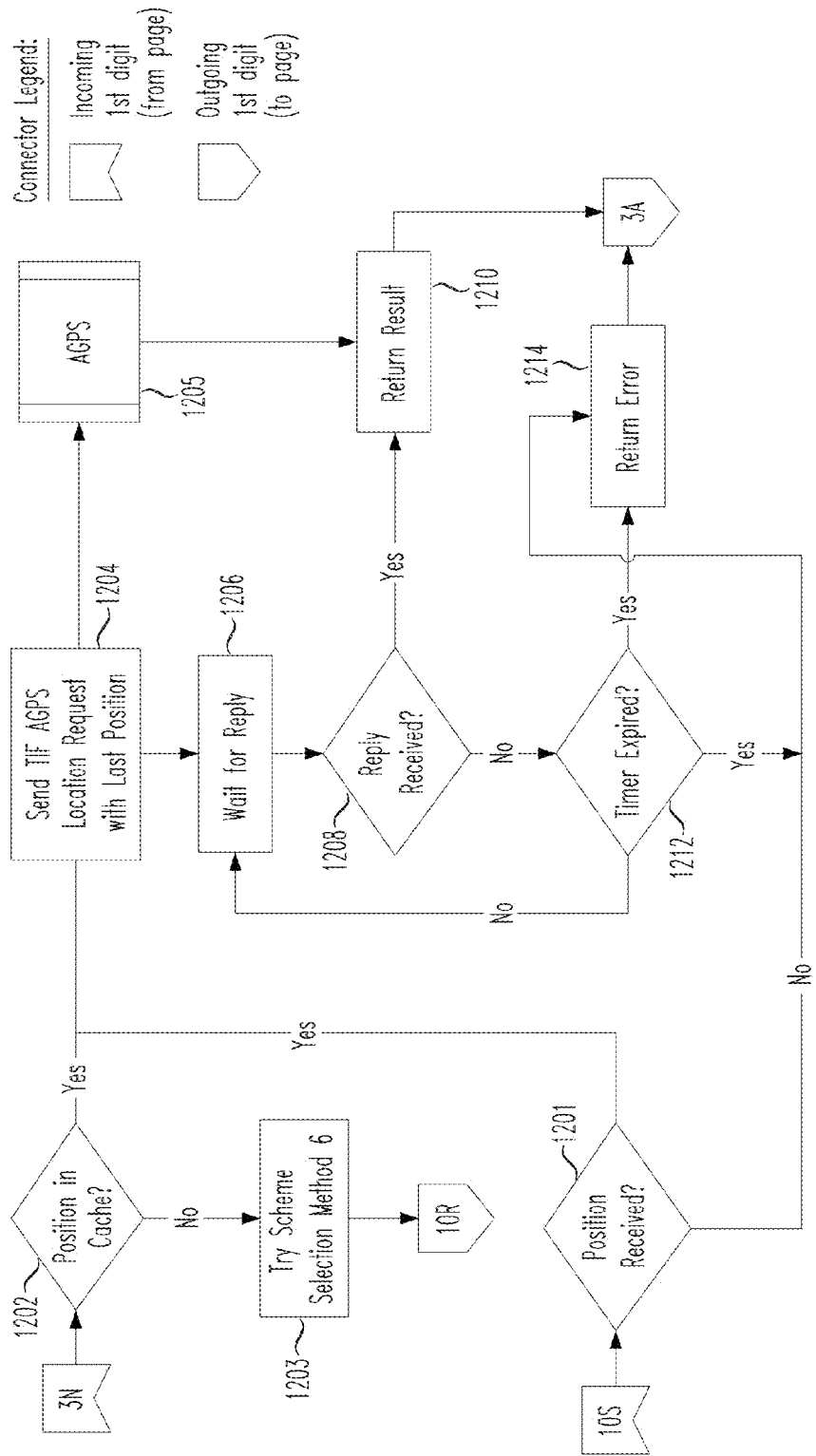
FIG. 12 shows exemplary scheme selection method 7 wherein an Assisted Global Positioning Satellite (AGPS) system mechanism is used to retrieve accurate position information regarding a target user equipment, in accordance with the principles of the present invention.

FIG. 12 shows exemplary scheme selection method 7 wherein an Assisted Global Positioning Satellite system (AGPS) mechanism is used to retrieve accurate position information regarding the target User Equipment, in accordance with the principles of the present invention.

In particular, FIG. 12 shows method 7, which uses Assisted GPS (AGPS) mechanism to retrieve the accurate position of the target User Equipment. In order to let the target User Equipment measure its position, the XLP needs to provide some assistance data to the target User Equipment. The assistance data is built upon the location information of the serving network element. Therefore, if no cached position information of the target User Equipment is available (or it is too old), the Telecommunication InterFace (TIF) 102 will initiate Method 6 to retrieve the necessary information from the core network.

In step 1202, it is determined whether the position is stored in cache 403, and if the position is not stored in cache 403, then the method exits in step 1203 and Scheme Selection Method 6 is tried (see FIG. 11). If the position is stored in cache 403, or if a position has been determined to have been received in step 1201, then in step 1204 a location request is sent with the last position to AGPS unit 1205, and in step 1206 the TIF 102 waits for a reply. In step 1208 it is determined whether a reply has been received, and if a reply has been received, then in step 1210 a result is returned. If a reply has not been received, then in step 1212 it is determined whether the timer has expired, and if the timer has expired, or if no position was received in step 1201, then in step 1214 an error is returned. If the timer has not expired, then the method returns to step 1206.

Method 8

Figure 13:
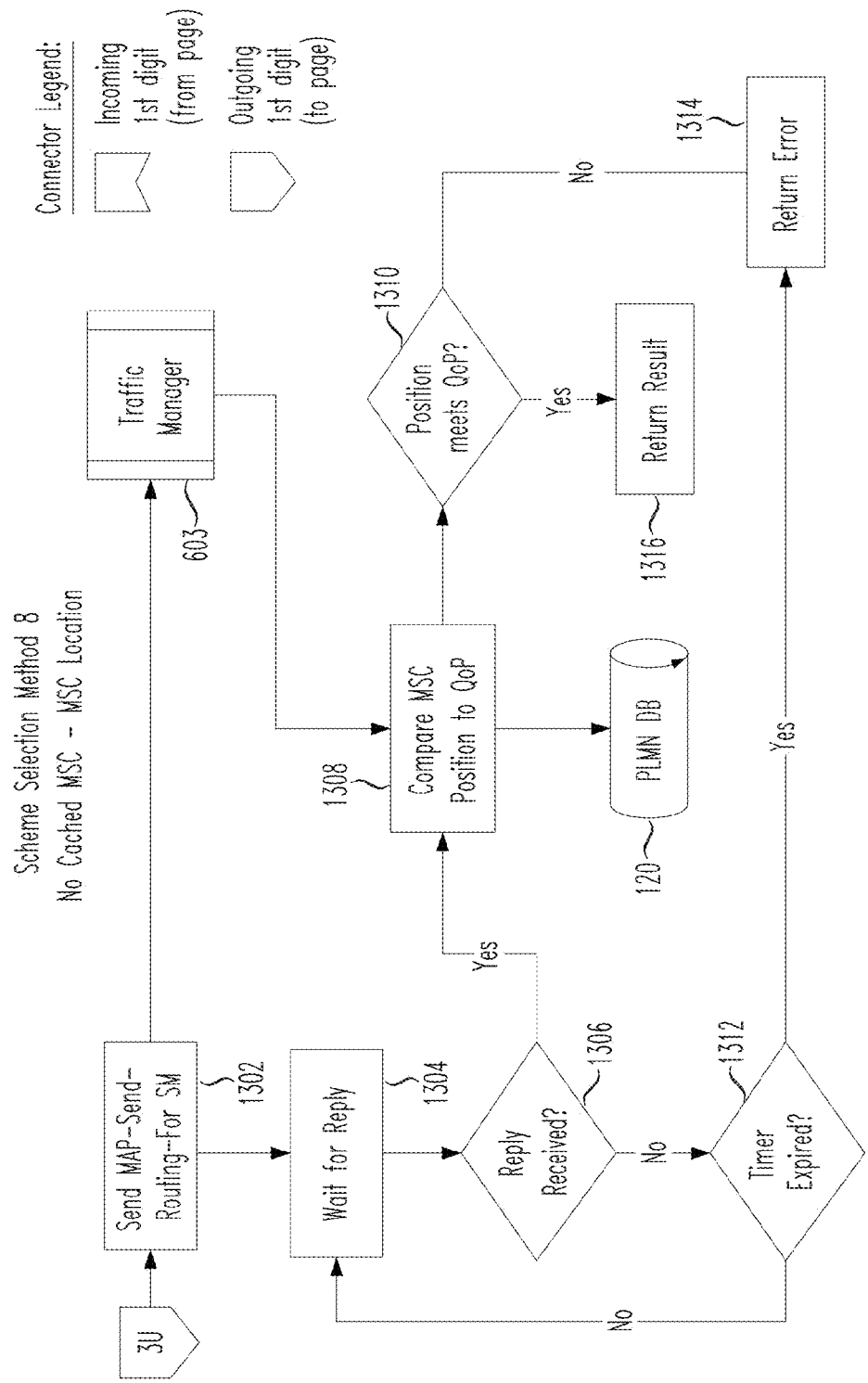
FIG. 13 shows exemplary scheme selection method 8 wherein cached position information is available, in accordance with the principles of the present invention.
Figure 16:
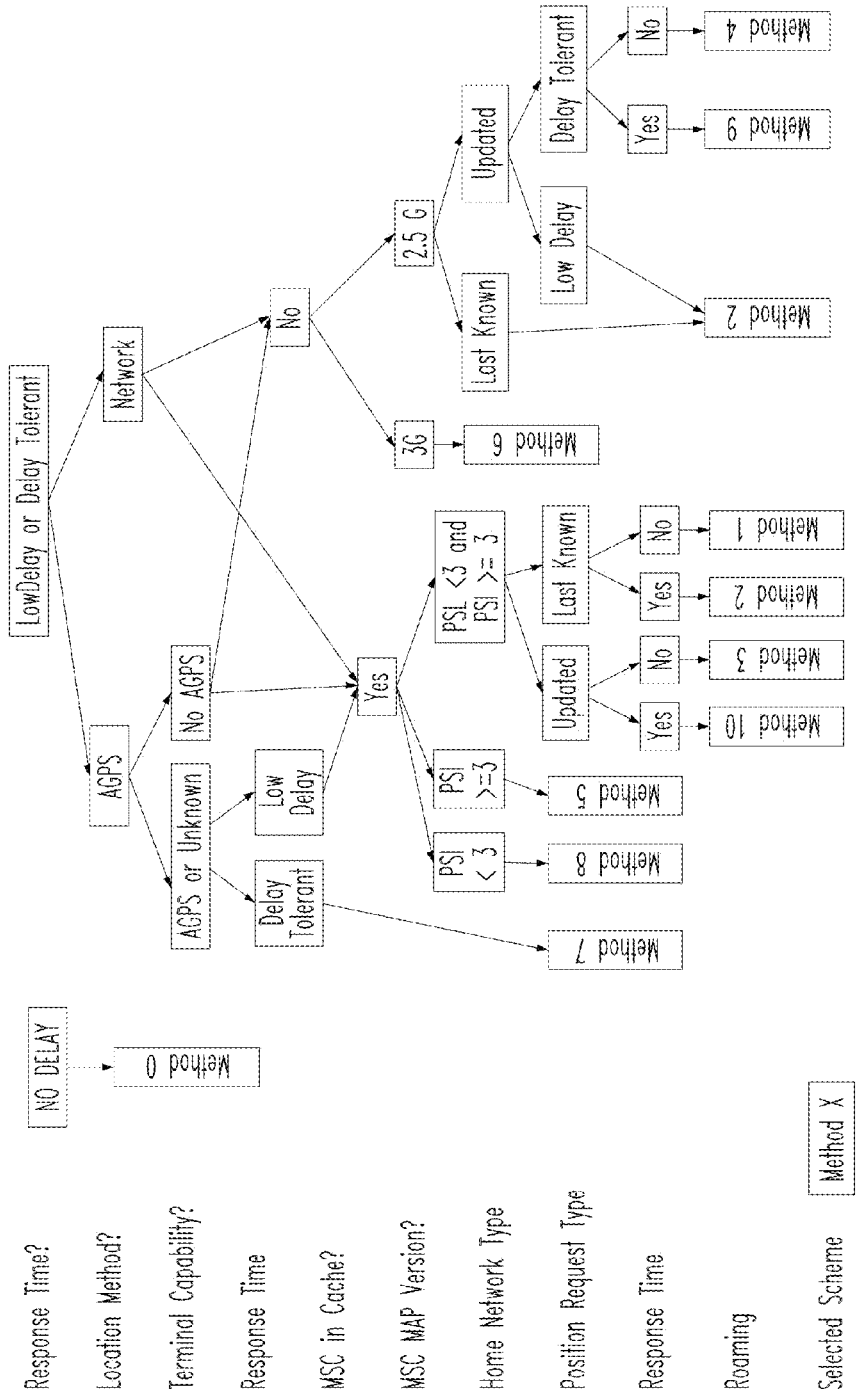
FIG. 16 shows a simplified scheme selection decision tree for the embodiment shown in FIG. 14.
Figure 17:
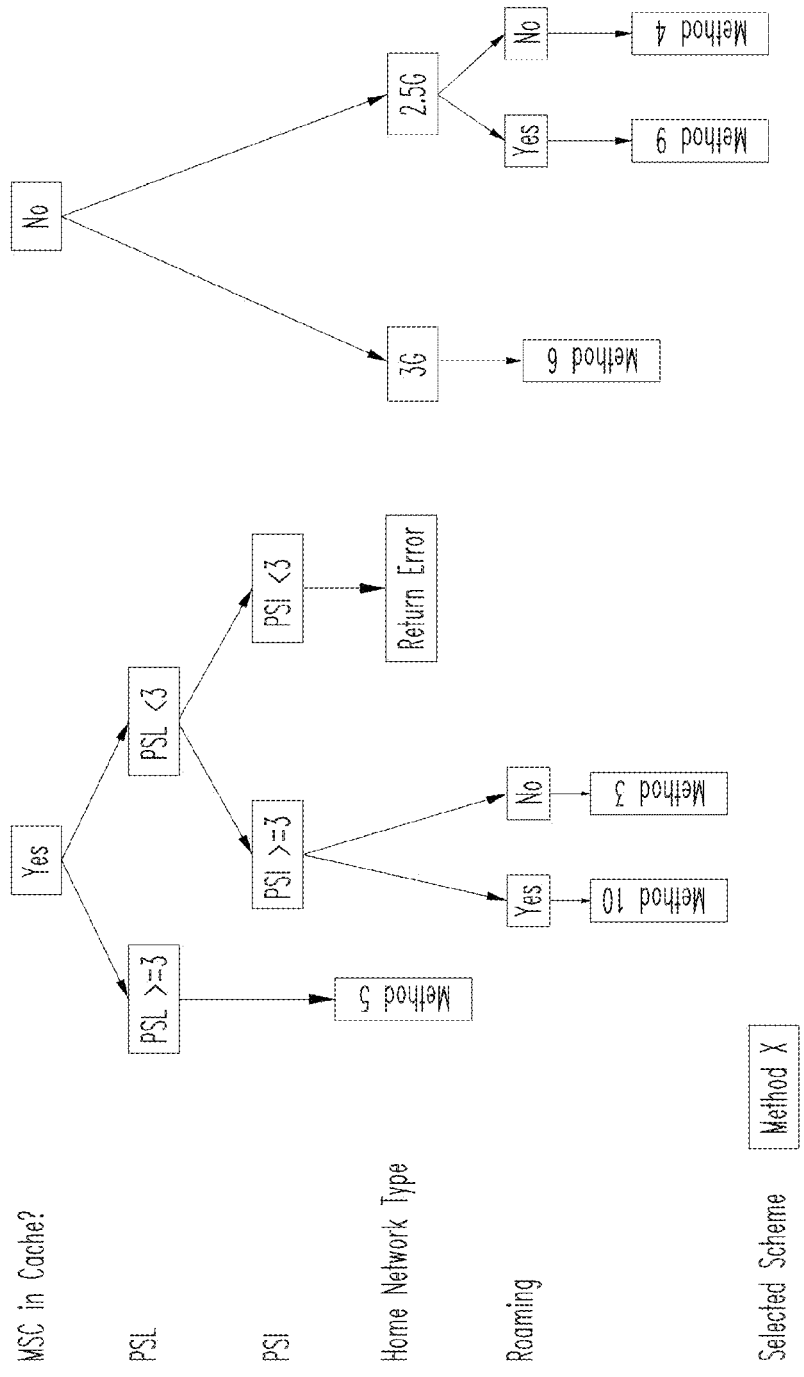
FIGS. 17 and 18 show an exemplary decision tree for handling an assisted GPS coarse position request.
Figure 18:
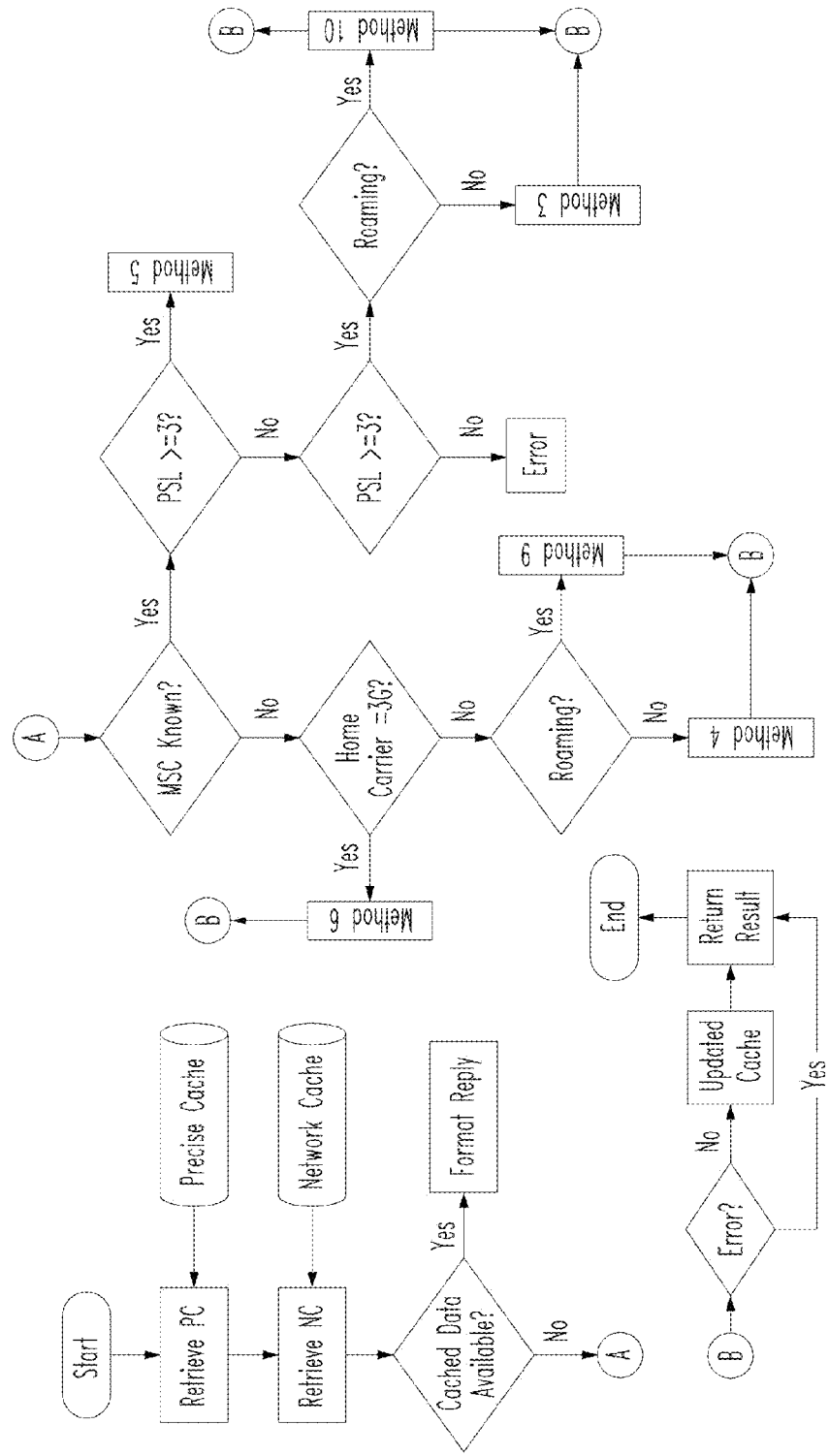
Figure 19:
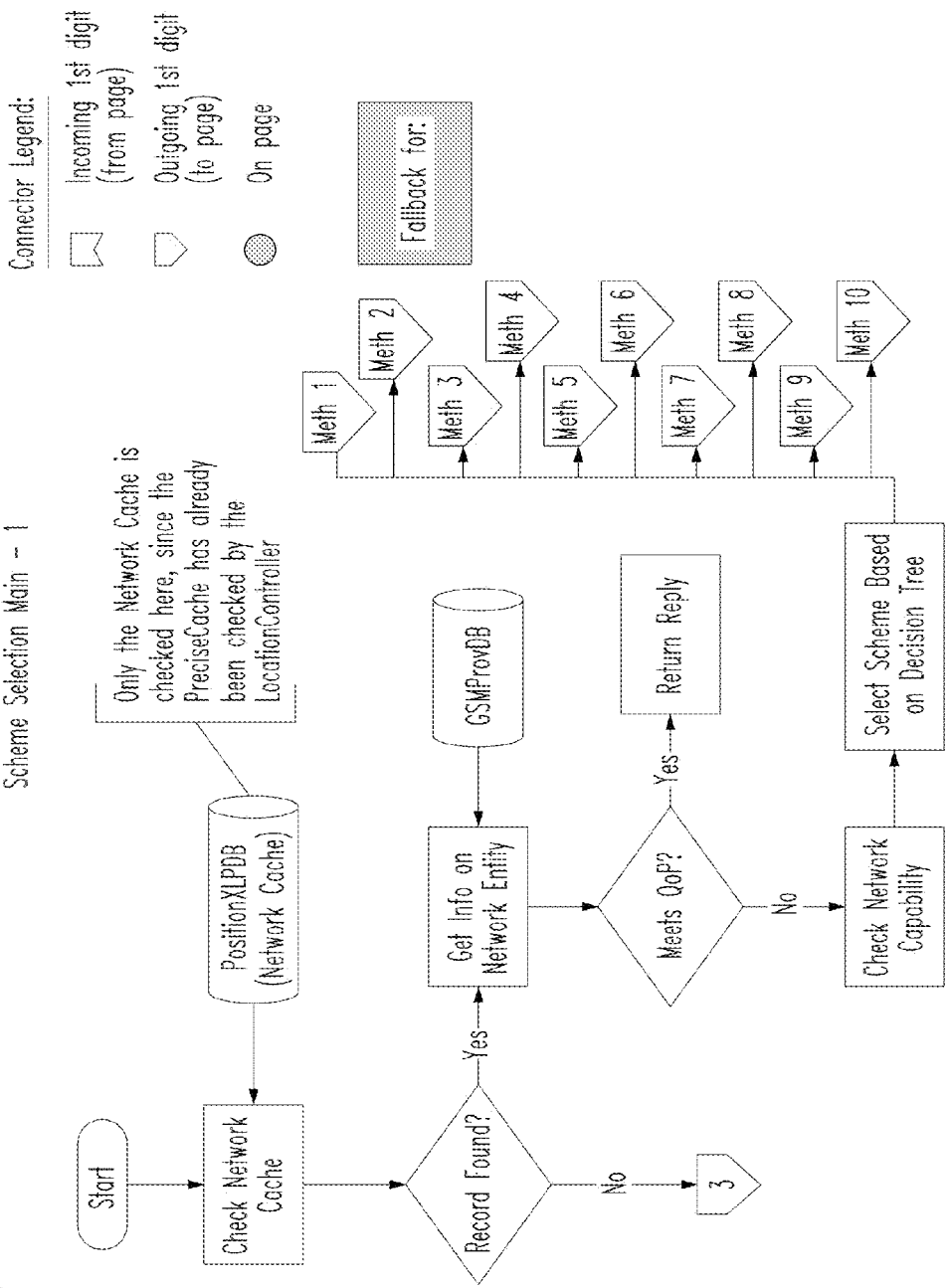
FIGS. 19-21 show an exemplary main scheme selection routine of the embodiment shown in FIG. 14.
Figure 20:
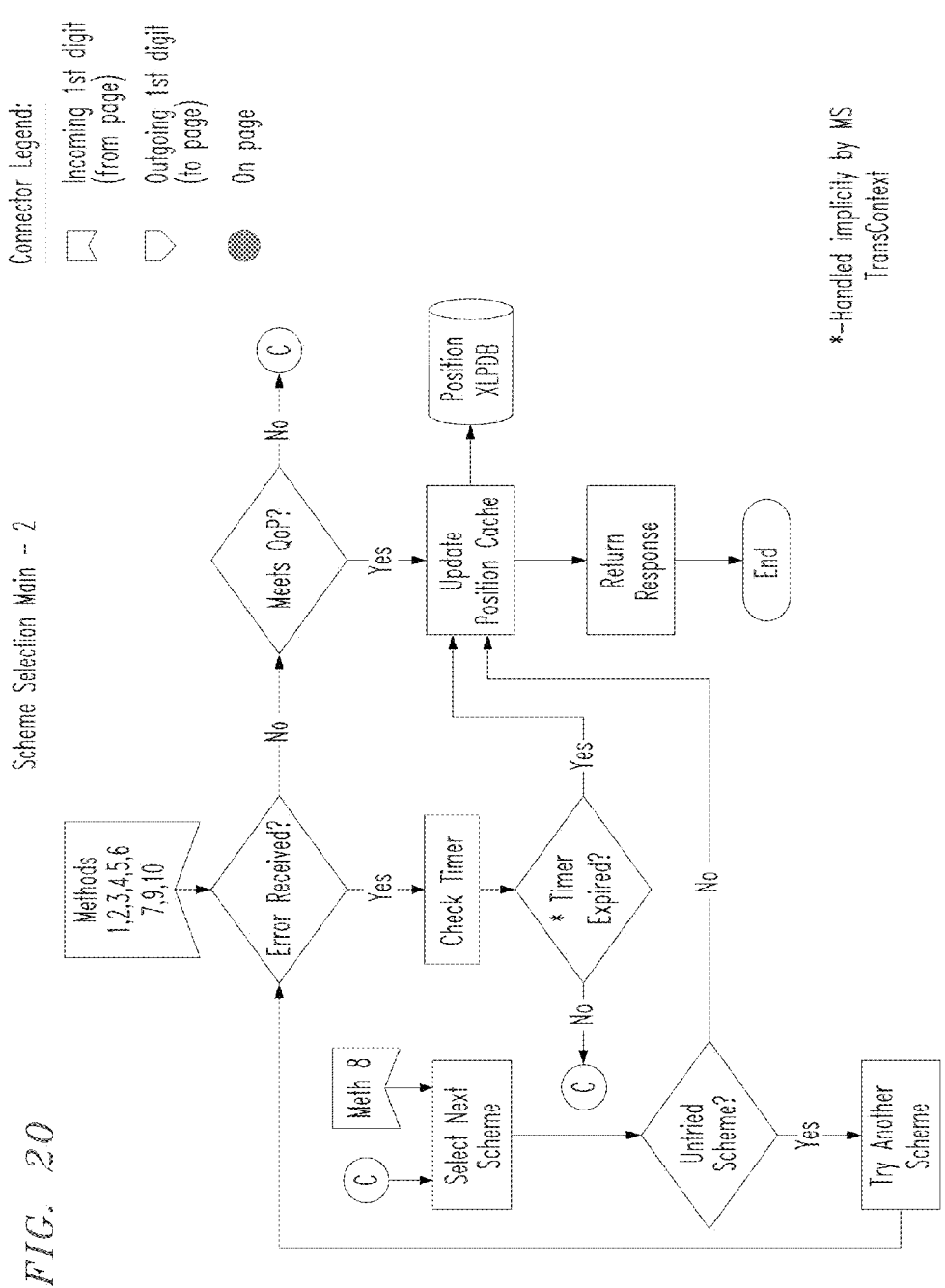
Figure 21:
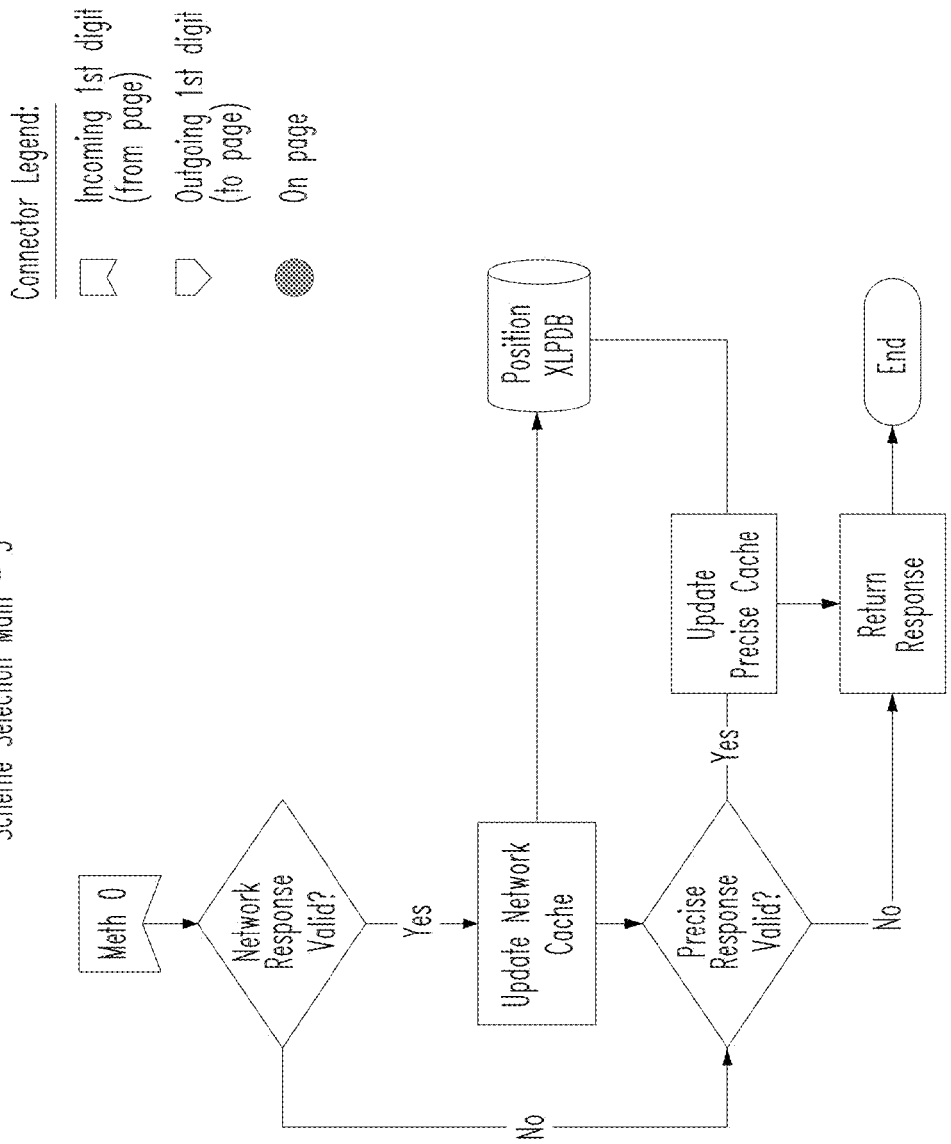
Figure 22:
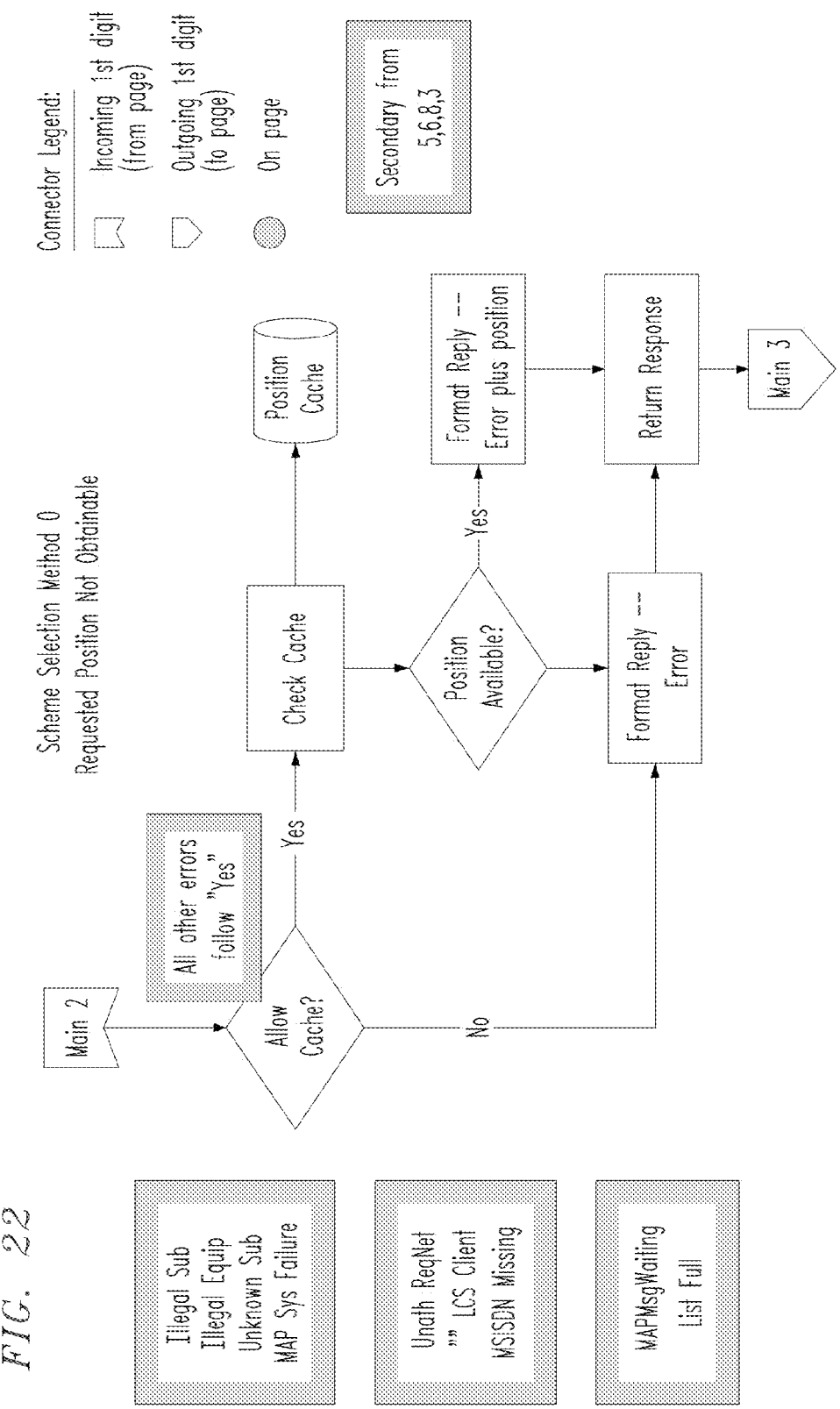
FIG. 22 shows an exemplary routine for method 0 of the scheme selection where the requested position is not obtainable.
Figure 23:
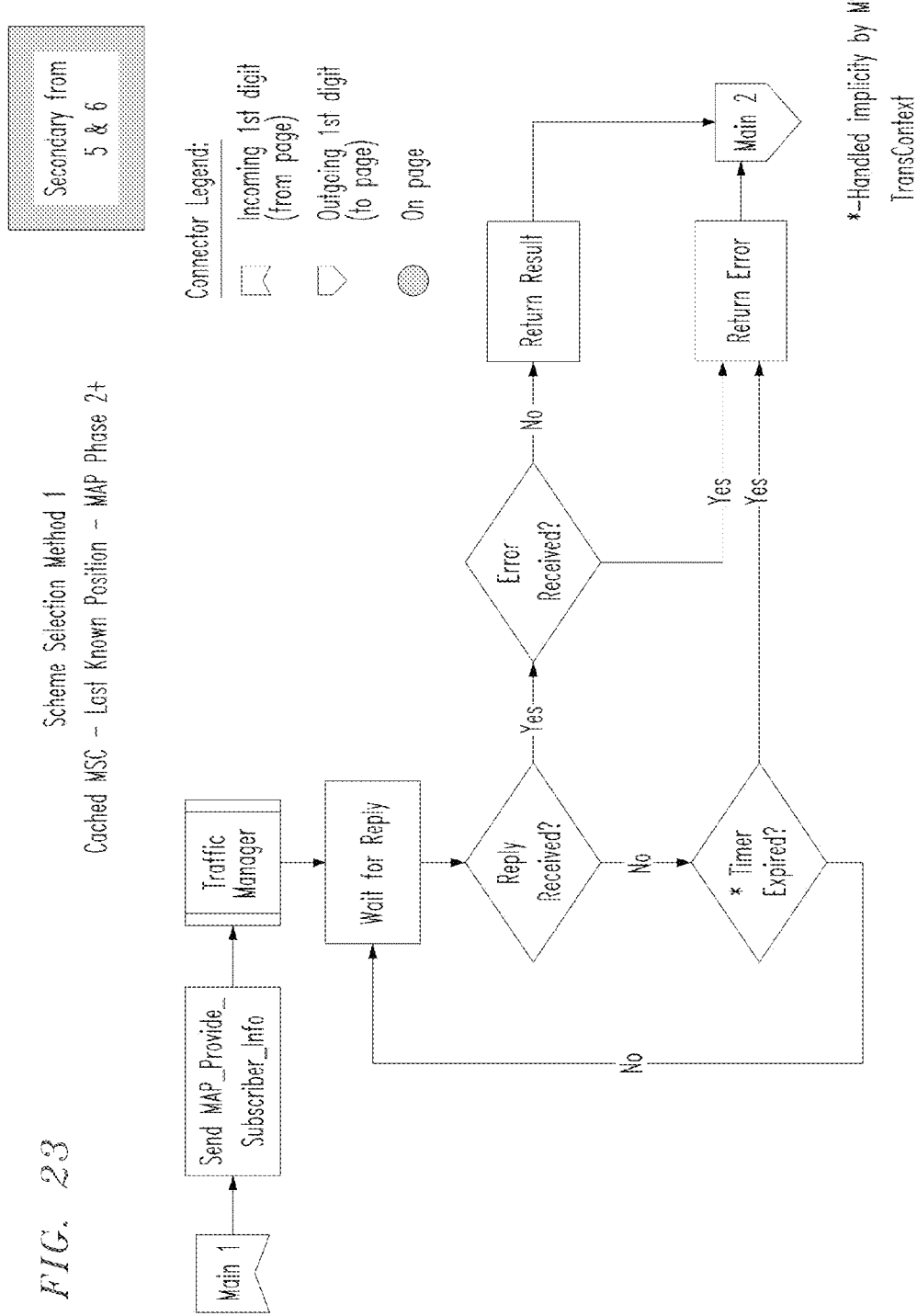
FIG. 23 shows an exemplary routine for method 1 of the scheme selection for cached MSC-last known position-MAP phase 2+.
Figure 24:
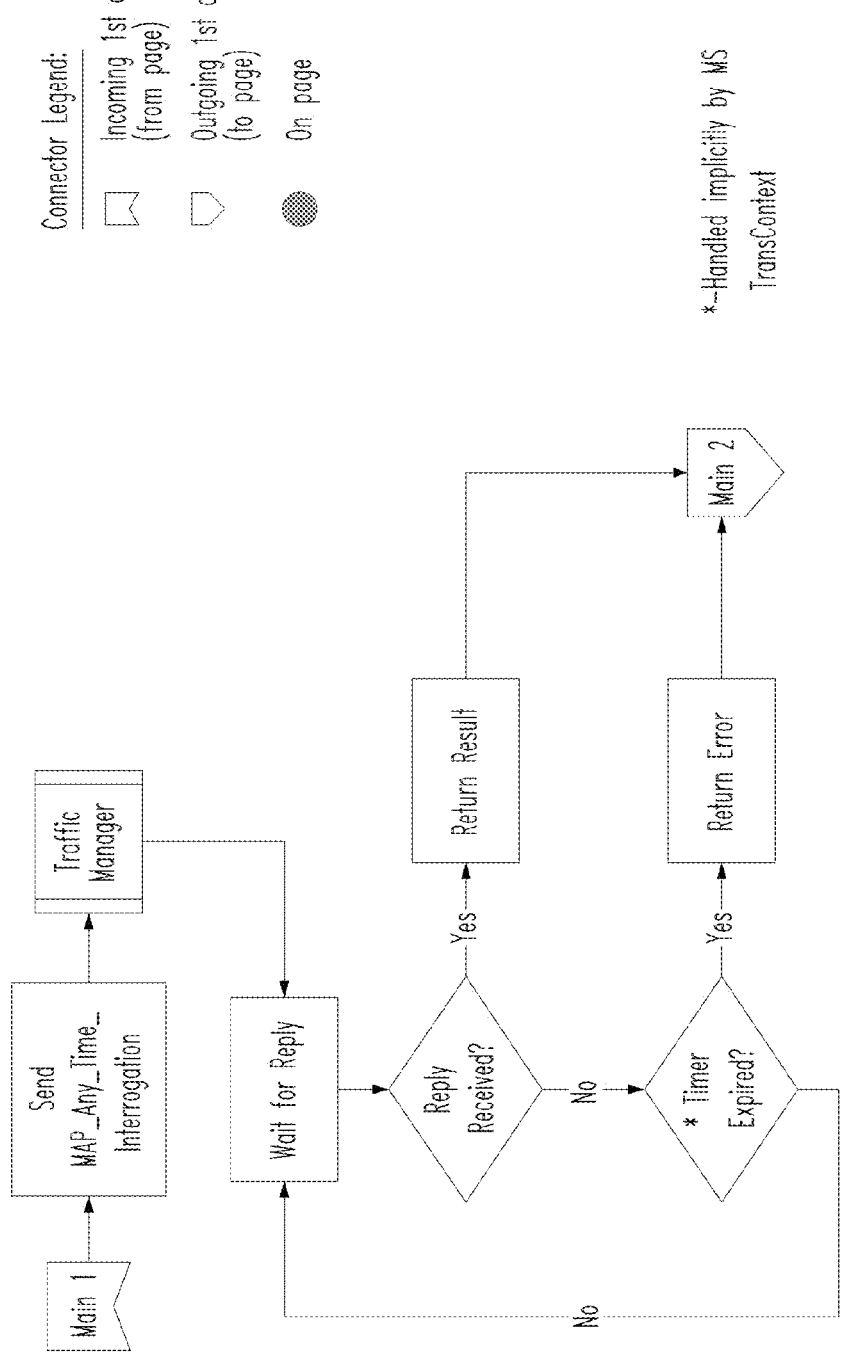
FIG. 24 shows an exemplary routine for method 2 of the scheme selection for no cached MSC-last known position-MAP phase 2+.
Figure 25:
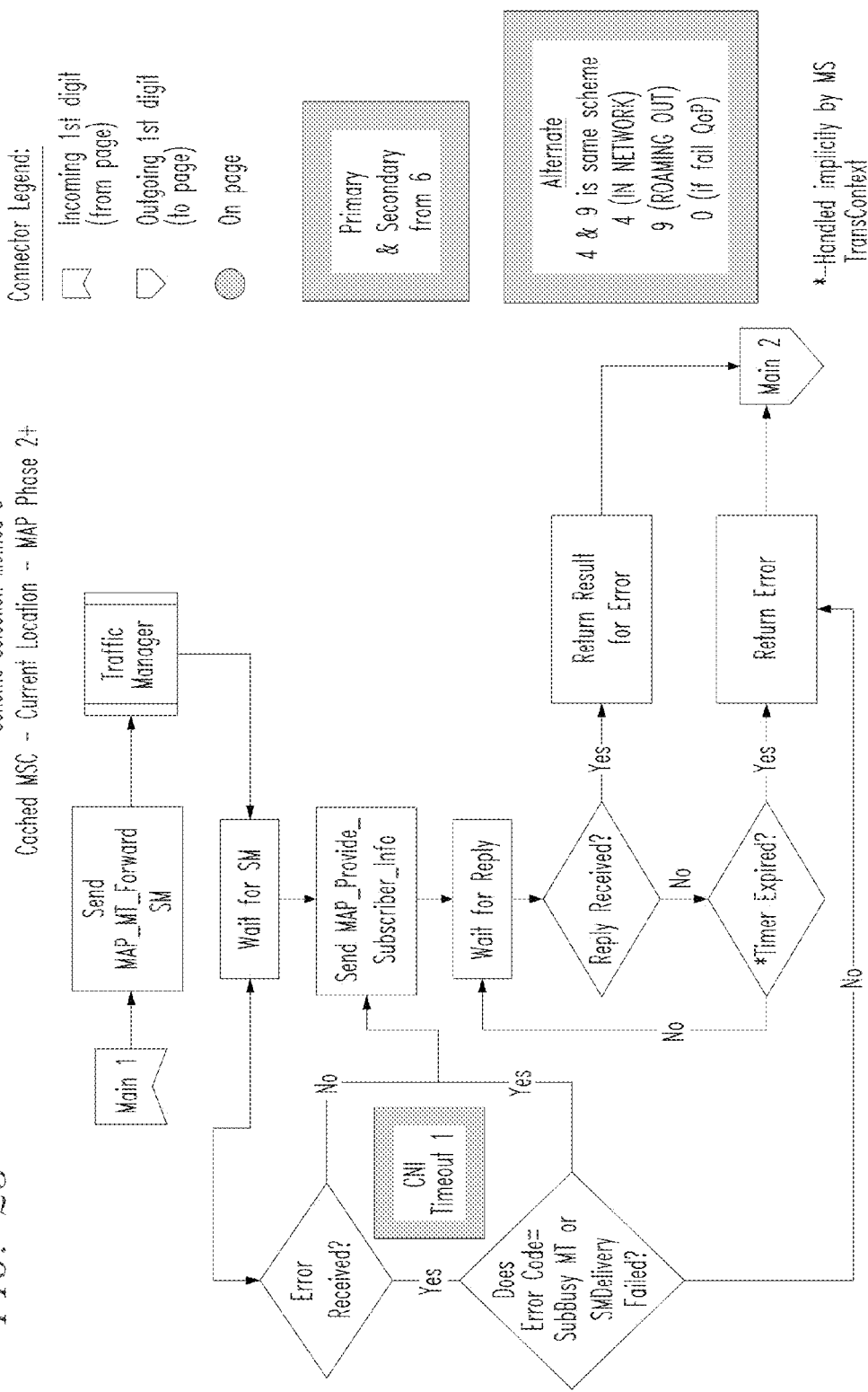
FIG. 25 shows an exemplary routine for method 3 of the scheme selection for cached MSC-current location-MAP phase 2+.
Figure 26:
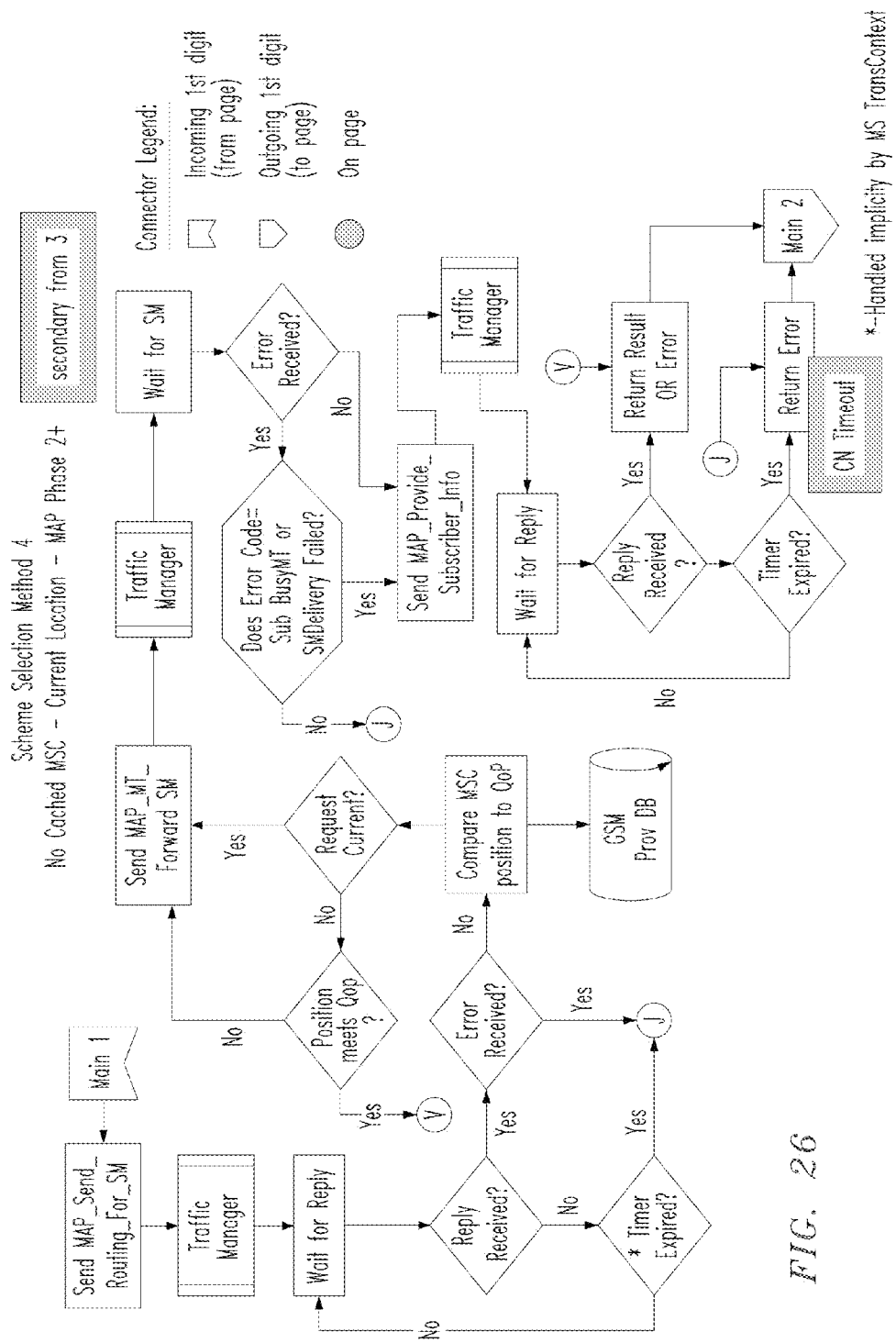
FIG. 26 shows an exemplary routine for method 4 of the scheme selection for no cached MSC-current location-MAP phase 2+.
Figure 27:
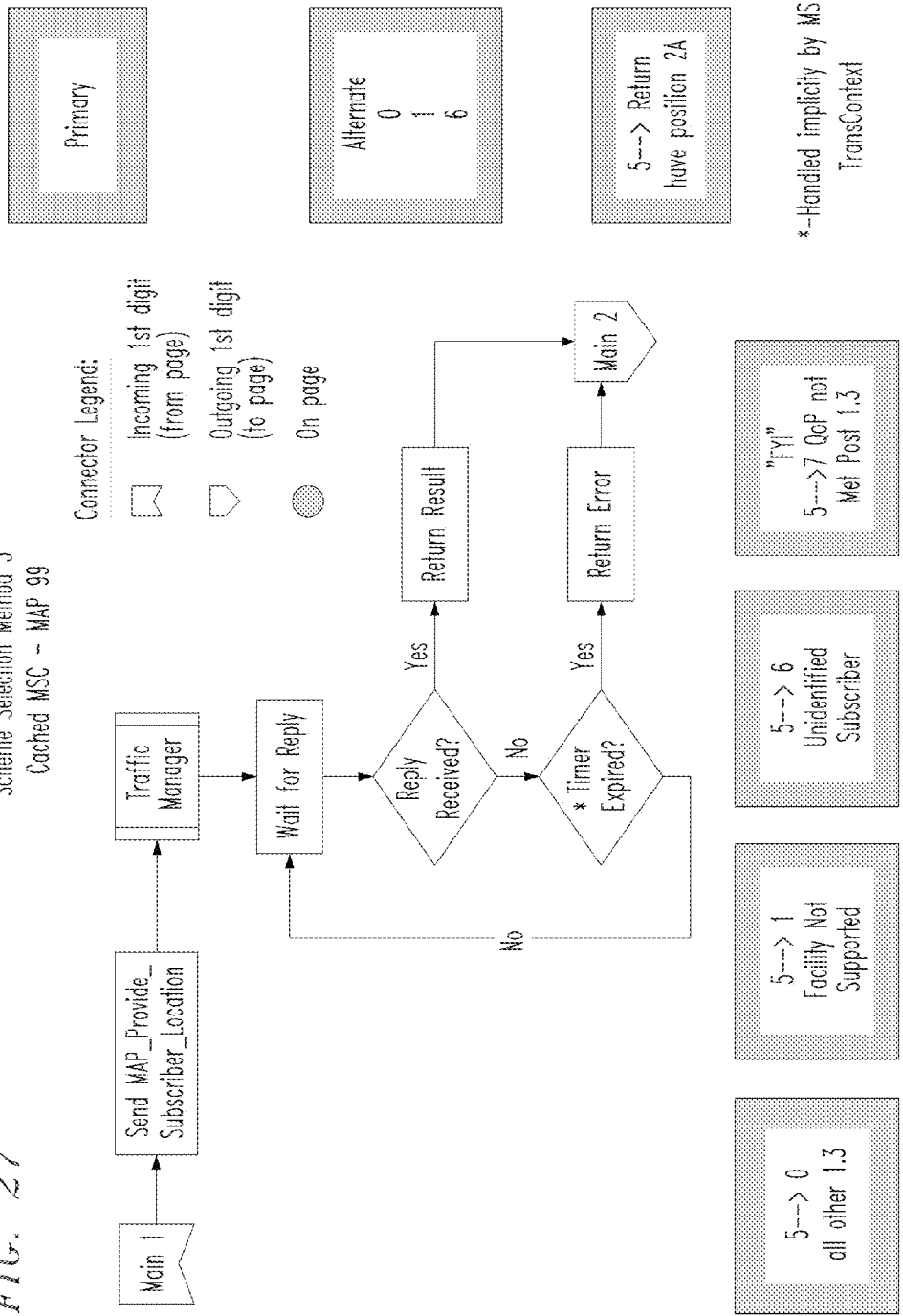
FIG. 27 shows an exemplary routine for method 5 of the scheme selection for cached MSC-MAP 99.
Figure 28:
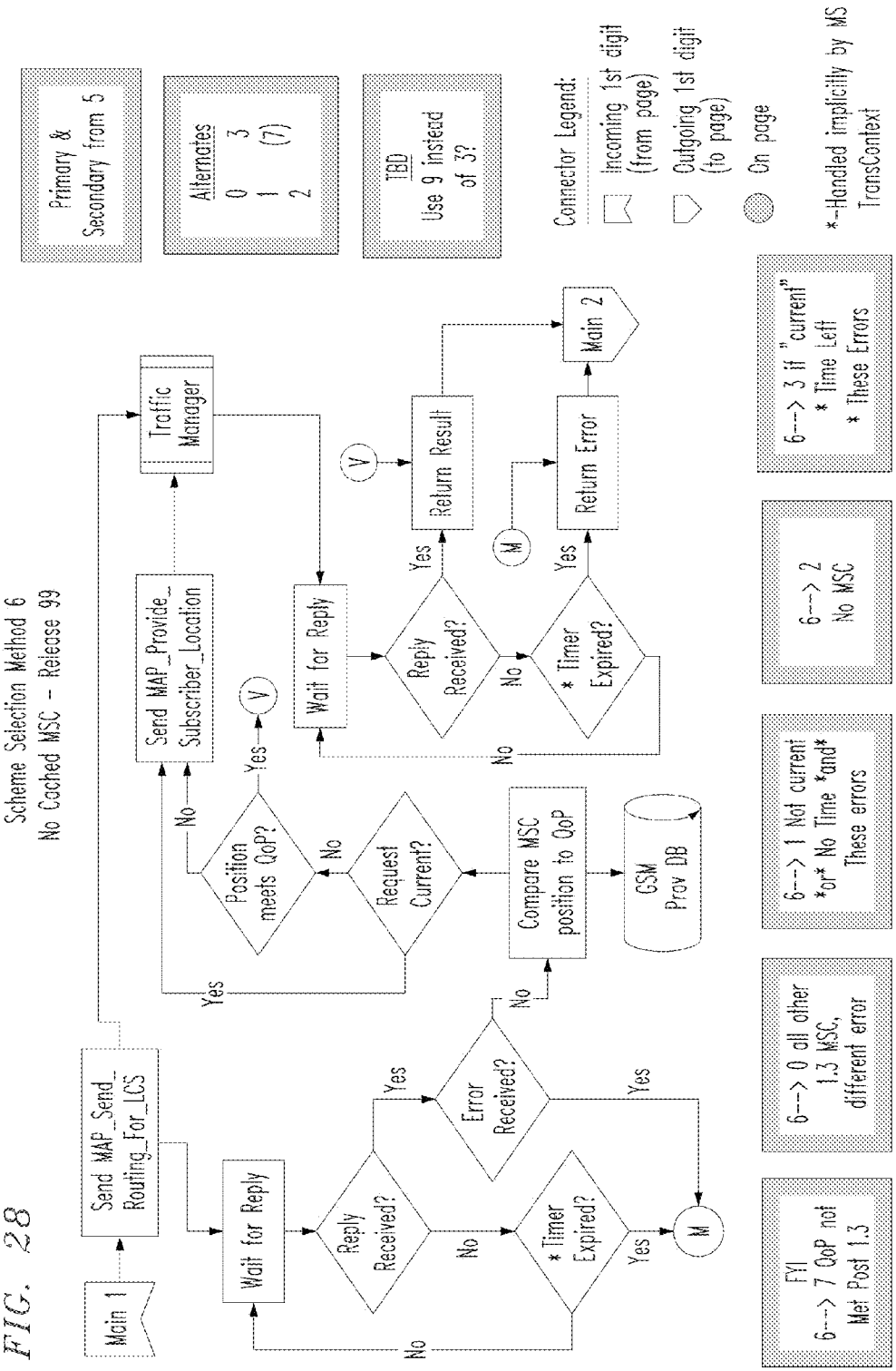
FIG. 28 shows an exemplary routine for method 6 of the scheme selection for no cached MSC-release 99.
Figure 29:
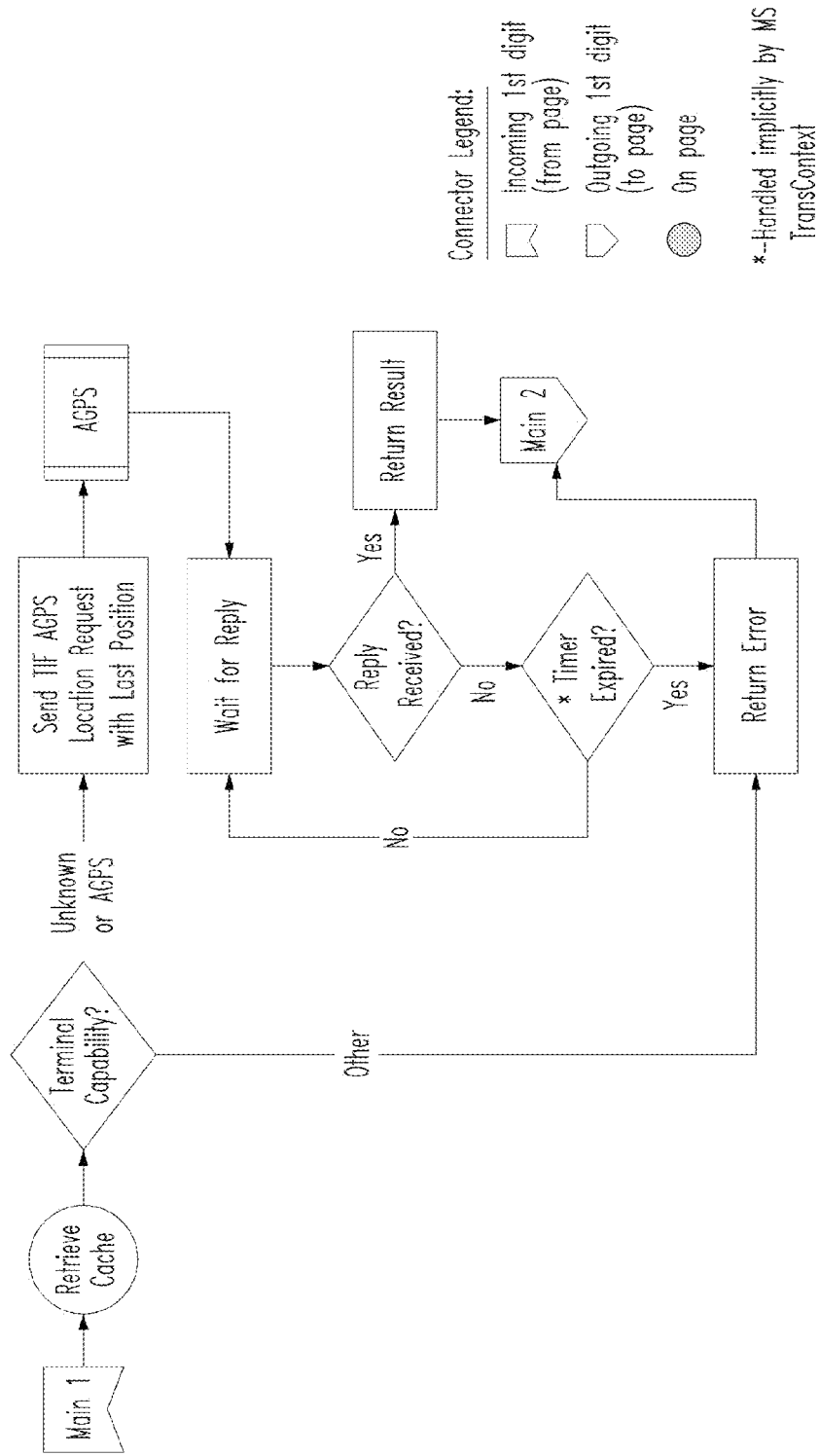
FIG. 29 shows an exemplary routine for method 7 of the scheme selection for assisted GPS location.
Figure 30:
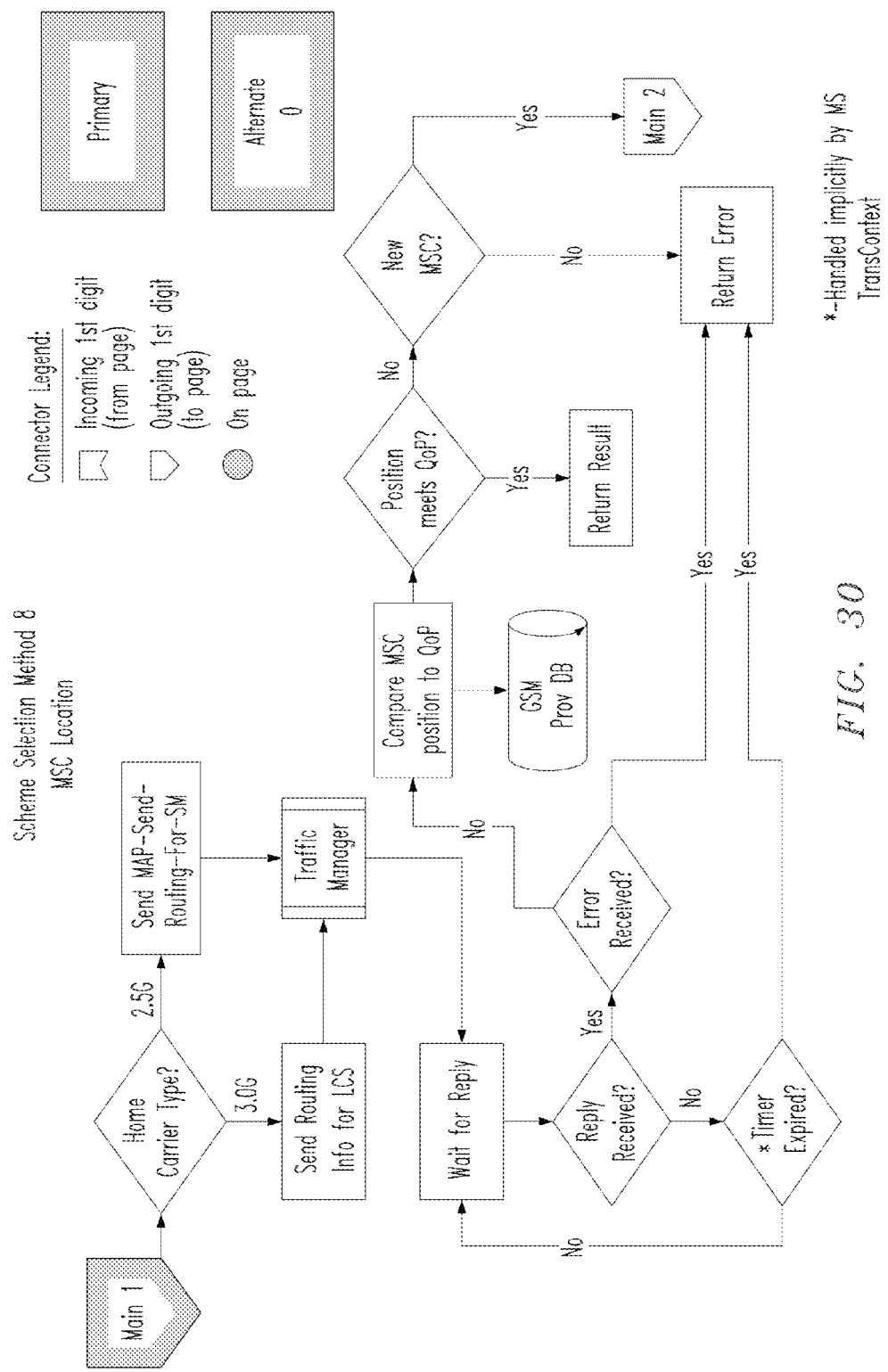
FIG. 30 shows an exemplary routine for method 8 of the scheme selection for MSC location.
Figure 31:
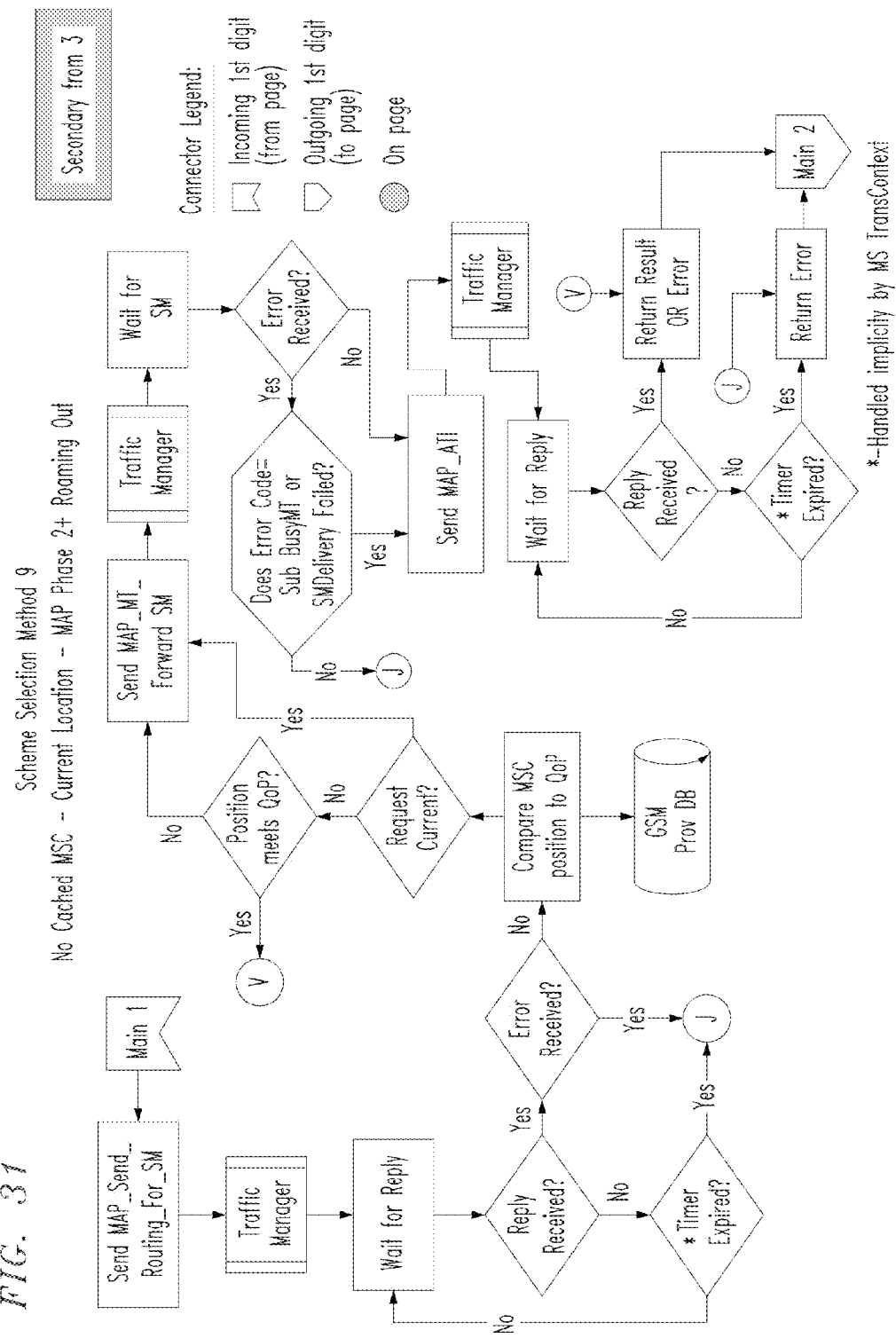
FIG. 31 shows an exemplary routine for method 9 of the scheme selection for no cached MSC-current location-MAP phase 2+ roaming out.
Figure 32:
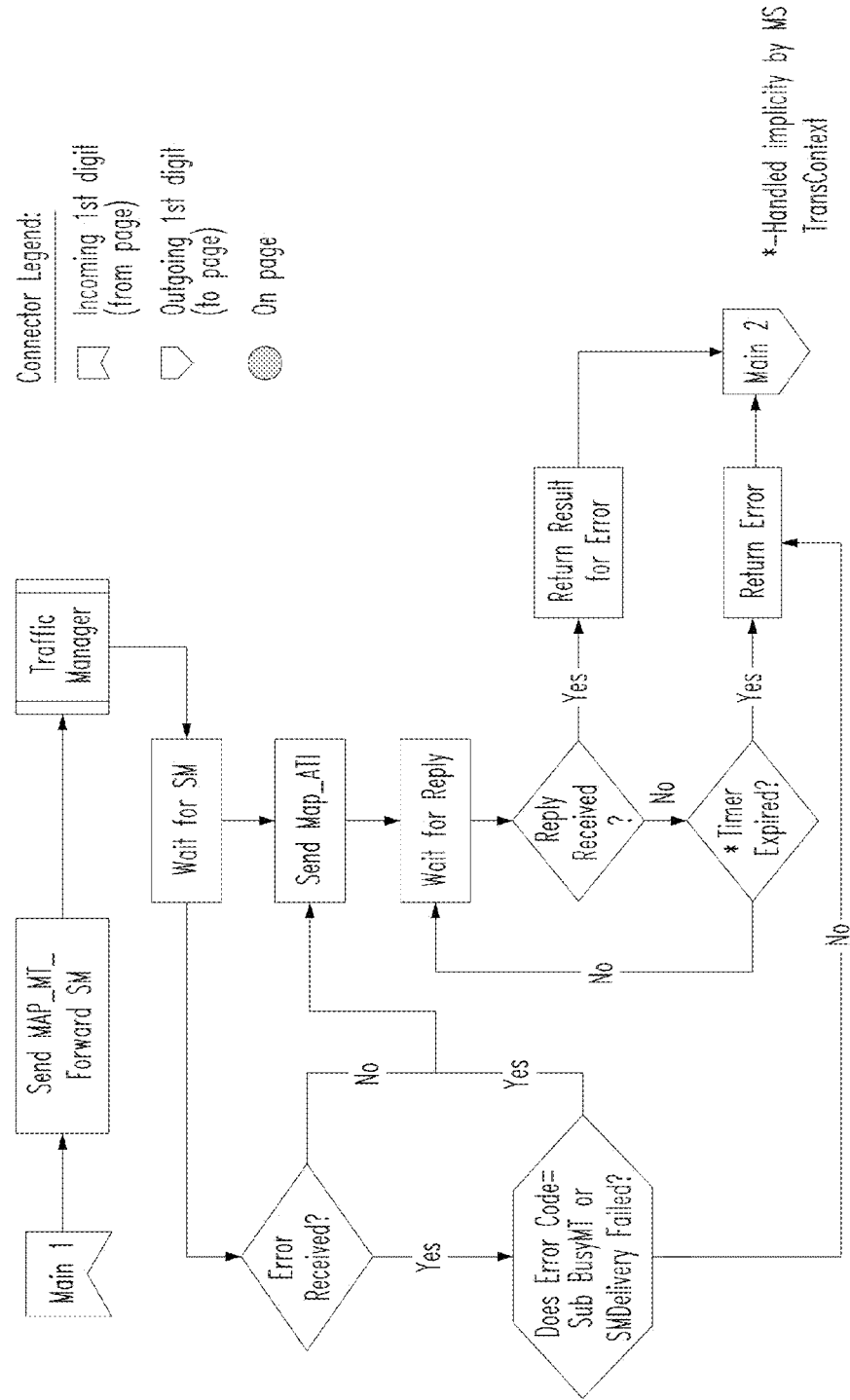
FIG. 32 shows an exemplary routine for method 10 of the scheme selection for cached MSC-current location-roaming.

FIG. 13 shows exemplary scheme selection method 8 wherein cached position information is available, in accordance with the principles of the present invention.

In particular, FIG. 13 shows method 8, which is used for the case that the cached position information is available, indicating that the serving Mobile Switch Center (Mobile Switch Center (MSC))/Serving GPRS Support Node (SGSN) supports either Mobile Application Part (MAP) version 1 or version 2, and the request Type is CURRENT.

In step 1302, a MAP_Send_Routing_For Short Message is sent by TIF 102 to Traffic Manager 603, and in step 1304 the TIF 102 waits for a reply. In step 1306 it is determined whether a reply has been received, and if a reply has been received, then the MSC position is compared to the desired Quality of Position (QoP) in step 1308 by using the PLMN database 120, and in step 1310 it is determined whether the position meets the desired QoP. If a reply has not been received, then in step 1312 it is determined whether the timer has expired, and if the timer has expired, then in step 1314 an error is returned. If the timer has not expired, then the method returns to step 1304. If the position meets the desired QoP, then a result is returned in step 1316, and if the position does not meet the desired QoP, then an error is returned in step 1314.

Other methods are possible and encompassed by the present invention. For instance, FIGS. 14 to 32 show methods of another embodiment of the present invention in accordance with the present invention.

The present invention provides a significant advantage of the reduction of unnecessary SS7 network traffic.

While the invention has been described with reference to the exemplary embodiments thereof, those skilled in the art will be able to make various modifications to the described embodiments of the invention without departing from the true spirit and scope of the invention.

What is claimed is:

1. A method comprising:
receiving, at a networked location server, a request for a current position of a given wireless device, the request comprising:
a quality of position parameter; and
an identification parameter identifying a given location services equipment to provide the current position;
obtaining a cached last known position of the given wireless device from a data store in response to the request;
retrieving the current position from the given location services equipment in response to determining that the cached last known position does not satisfy the quality of position parameter;
retrieving another current position from another location services equipment in response to determining that the current position does not satisfy the desired quality of service position parameter; and
providing the other current position in response to the request.

2. An apparatus comprising a telecommunication interface configured to:
receive a request for a current position of a given wireless device, the request comprising:
a quality of position parameter;
a response time parameter; and
an identification parameter identifying a given location services equipment to provide the current position;
obtain a cached last known position of the given wireless device from a data store in response to the request;
retrieve the current position from the given location services equipment in response to a determination that the cached last known position does not satisfy the quality of position parameter;
retrieve another current position from another location services equipment in response to a determination that the current position does not satisfy the quality of service position parameter and that a time related to the response time parameter not being exceeded; and
provide the cached last known position in response to the request in response to the time related to the response time parameter being exceeded.

3. The method of 1, wherein the request further comprises a response time parameter; further comprising: setting a response timer based on the response time parameter, wherein the other current position is provided in response to the request when the response timer is not expired.

4. The apparatus of claim 2, wherein the telecommunication interface is further configured to: measure the time after the request for position information is received based on the response time parameter.

5. The method of claim 1, wherein the request further comprises a request type, the request type selected from one of an updated location request and a current location request.

6. The method of claim 1, wherein the request further comprises an updated location request type.

7. The method of claim 1, wherein the request further comprises a current location request type.

* * * * *